United States Patent [19]

Matsuda

[11] Patent Number: 5,009,279
[45] Date of Patent: Apr. 23, 1991

[54] METHOD AND SYSTEM FOR DETECTING WHEEL SLIPPAGE

[75] Inventor: Toshiro Matsuda, Sagamihara, Japan

[73] Assignee: Nissan Motor Company, Limited, Yokohama, Japan

[21] Appl. No.: 918,125

[22] Filed: Oct. 14, 1986

[30] Foreign Application Priority Data

Oct. 11, 1985 [JP] Japan .................. 60-224936

[51] Int. Cl.$^5$ ............................. B60K 28/16
[52] U.S. Cl. ...................... 180/197; 364/424.1
[58] Field of Search .................. 180/197, 233; 364/424.1

[56] References Cited

U.S. PATENT DOCUMENTS

| | | | |
|---|---|---|---|
| 3,776,357 | 12/1973 | Arai et al. | 180/82 R |
| 4,075,538 | 2/1978 | Plunkett | 180/197 |
| 4,538,700 | 9/1985 | Suzuki | 180/197 |
| 4,562,541 | 12/1985 | Sakakiyama | 180/197 |
| 4,625,824 | 12/1986 | Leiber | 180/197 |
| 4,637,487 | 1/1987 | Nakamura et al. | 180/197 |

FOREIGN PATENT DOCUMENTS 0123280 10/1984 European Pat. Off. .
59-68537 4/1984 Japan .

Primary Examiner—Mitchell J. Hill
Attorney, Agent, or Firm—Foley & Lardner

[57] ABSTRACT

A method and a system derive a value representative of an actual vehicle speed in strict correspondence to actual vehicle speed. The value can be utilized to detect wheel slippage and allows precise traction control, anti-skid brake control and so forth. The method for deriving wheel slippage, according to the present invention, includes a step of deriving a projected vehicle speed, the rate of change of which varies with road surface friction. Wheel slippage is derived from on the projected vehicle speed and instantaneous wheel speed. In practice, the method includes a step for detecting the force exerted on a vehicular wheel, which force includes a resistance variable depending upon the road surface friction $\mu$. Based on the detected force, the projected vehicle speed variation pattern is derived so as to derive an instantaneous projected vehicle speed.

14 Claims, 9 Drawing Sheets

METHOD AND SYSTEM FOR DETECTING WHEEL SLIPPAGE

BACKGROUND OF THE INVENTION

1. Field of the Invention

The present invention relates generally to a method and system for detecting or deriving wheel slippage in an automotive vehicle. More specifically, the invention relates to a method and a system for deriving a wheel slippage value to utilize in traction control for automotive vehicle wheels, in an anti-skid brake control system and so forth.

2. Description of the Background Art

In general, wheel slippage is reflected in the difference between actual vehicle speed and an assumed vehicle speed derived based on previous wheel speeds. When the actual vehicle speed is lower than the assumed vehicle speed, it means the driven wheel is spinning. On the other hand, when the actual vehicle speed is higher than the assumed vehicle speed, it means the vehicle wheel is skidding. Wheel-spin is caused by loss of road/tire traction. Therefore, in such cases, traction must be controlled in order to stop the vehicular wheel from spinning. On the other hand, wheel-skidding occurs during abrupt application of the brakes and is due to the wheels locking up. For example, such traction controls have been disclosed in U.S. Pat. No. 3,893,535, issued on July 8, 1975, to M. H. Burckhardt, et al. and in Japanese Patent First Publication (Tokkai Showa) 59-68537, published on Apr. 18, 1984. In both cases, the rotation speed of a driven wheel which is driven by engine output is compared with the rotation speed of a non-driven wheel which rotates freely. The rotation speed of the non-driven wheel is treated as a parameter reflecting actual vehicle speed.

The detection of the wheel slippage as disclosed in the aforementioned prior art is not applicable to anti-skid or traction control for a four-wheel drive vehicle. This is due to the fact that a four-wheel drive vehicle has four driven wheels and thus there are no non-driven wheels free of engine output.

On the other hand, a method has been proposed for utilizing a projected vehicle speed value which is derived from the wheel speed obtaining immediately before the wheel slippage occurs. In this case, instantaneous projected vehicle speed at every moment is assumed based on the projected vehicle speed derived based on the wheel speed immediately before the wheel slippage occurs, according to a predetermined vehicle speed variation pattern.

On the other hand, vehicle speed variation is seriously affected by road surface friction $\mu$. Therefore, the rate of change of vehicle speed varies with the road surface friction. However, in the conventionally proposed method, the vehicle speed variation pattern is a fixed pattern regardless of possible changes in the road surface friction $\mu$. Therefore, the instantaneous projected vehicle speed does not always reflect the actual vehicle speed.

SUMMARY OF THE INVENTION

Therefore, it is an object of the present invention to provide a method and a system for deriving a value representative of actual vehicle speed, which value may strictly correspond to actual vehicle speed.

Another object of the invention is to provide a method and a system for deriving a projected vehicle speed which allows precise traction control, anti-skid brake control and so forth.

A further and more specific object of the invention is to provide a method and a system for deriving a projected vehicle speed value related to road surface friction $\mu$.

In order to accomplish the aforementioned and other objects, a method for deriving a wheel slippage value, according to the present invention, includes a step of deriving a projected vehicle speed, the rate of change of which varies with road surface friction. Wheel slippage is derived from the projected vehicle speed and the instantaneous wheel speed.

In practice, the method includes a step of detecting the force exerted on a vehicular wheel, including a resistance value adjustable according to the road surface friction $\mu$. Based on the detected force, the projected vehicle speed variation pattern is used to derive an instantaneous projected vehicle speed value.

According to one aspect of the invention, a system for detecting wheel slippage comprises a first sensor for monitoring wheel rotation and producing a first sensor signal indicative of the wheel speed, a second sensor for monitoring a parameter reflecting road surface friction and producing a second sensor signal indicative thereof, a reference signal generator for generating a reference signal having a value reflecting a projected vehicle speed based on the first sensor signal value, and arithmetic means for modifying the reference signal value based on the second sensor signal value and comparing the first sensor signal value with the modified reference signal value so as to detect occurrences of wheel slippage.

In the preferred embodiment, the second sensor monitors driving torque to be exerted on a vehicular wheel.

In practice, the arithmetic circuit also derives a wheel acceleration value based on the first sensor signal and compares the wheel acceleration value with a given acceleration threshold to produce a command signal, and the reference signal generator samples the first sensor signal and in response to the command signal, holds the first sensor signal for use as an initial reference signal value. The arithmetic circuit derives an elapsed time dependent coefficient based on the second sensor signal value to derive an adjustment value based on the time elapsed since the reference signal generator last sampled the first sensor signal and the coefficient and derives the modified reference signal value based on the initial reference signal value and the adjustment value.

According to another aspect of the invention, a system for detecting wheel slippage comprises a first sensor for monitoring wheel rotation and producing a first sensor signal indicative of the wheel speed, a second sensor for monitoring a parameter reflecting road surface friction and producing a second sensor signal indicative thereof, a reference signal generator for generating a reference signal having a value reflecting a projected vehicle speed based on the first sensor signal value, and arithmetic means for modifying the reference signal value based on the second sensor signal value and comparing the first sensor signal value with the modified reference signal value so as to detect occurrences of wheel slippage.

According to a further aspect of the invention, a traction control system for an automotive vehicle having a wheel receiving driving torque from an automotive engine, comprises a first sensor for monitoring wheel rotation and producing a first sensor signal indicative of the wheel speed, a second sensor for monitoring a parameter reflecting road surface friction and producing a second sensor signal indicative thereof, a reference signal generator for generating a reference signal having a value reflecting a projected vehicle speed based on the first sensor signal value, controller means for modifying the reference signal value based on the second sensor signal value and comparing the first sensor signal value with the modified reference signal value so as to detect occurrences of wheel slippage and in such cases producing a control signal ordering-eduction of driving torque exerted on to the wheel -or recovering traction, and means for adjusting the driving torque exerted on the wheel, the driving torque adjusting means being responsive to the control signal to reduce the driving torque exerted on the wheel.

The second sensor monitors the driving torque exerted on a vehicular wheel. The arithmetic circuit also derives a wheel acceleration value based on the first sensor signal and compares the wheel acceleration value with a given acceleration threshold to produce a command signal, and the reference signal generator samples the first sensor signal and in response to the command signal, holds the first sensor signal for use as an initial reference signal value.

DESCRIPTION OF THE PREFERRED EMBODIMENT

Figure 1:
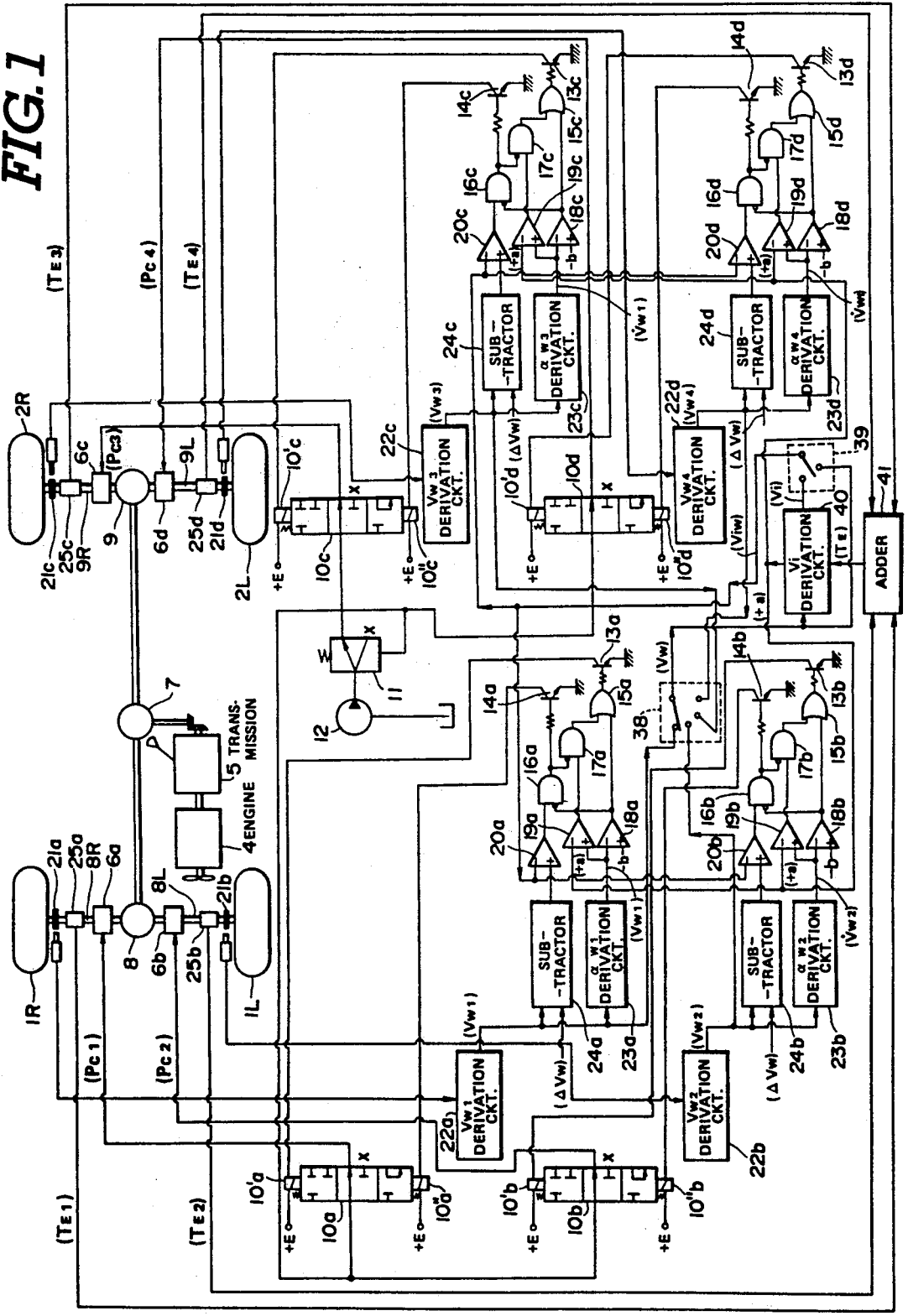
FIG. 1 is a diagram of the preferred embodiment of a traction control system in which the preferred embodiment of a wheel slippage derivation system according to the invention is incorporated.

Referring now to the drawings, particularly to FIG. 1, the preferred embodiment of a traction control system, according to the invention, controls road/tire traction at the left-front wherel $1_L$, right-front wheel $1_R$, left-rear wheel $2_L$ and right-rear wheel 2, by controlling the revolution speed of an automotive engine 4. In the shown embodiment, the traction control system is applied to a four wheel drive vehicle. Therefore, all of the left-front wherel $1_L$, right-front wheel $1_R$, left-rear wheel $2_L$ and right-rear wheel $2_R$ are driven wheels.

The output of the engine 5 is distributed through a power transmission 5, a center differential gear assembly 7, a front differential gear assembly 8 or a rear differential gear assembly 9 and multi-plate type hydraulic clutches 6a, 6b, 6c and 6d. The multi-plate type hydraulic clutches 6a, 6b, 6c and 6d respectively correspond to drive shafts 8L, 8R, 9L and 9R. The hydraulic clutches 6a, 6b, 6c and 6d control distribution of the engine driving torque to respectively corresponding wheels 1L, 1R, 2L and 2R. Specifically, when the hydraulic clutches 6a, 6b, 6c and 6d are engaged, engine output torque is distributed to respective wheels 1L, 1R, 2L and 2R, thus enabling four wheel driving.

The engaging pressure Pc1, Pc2, Pc3 and Pc4 applied to the hydraulic clutches 6a, 6b, 6c and 6d, respectively, are electrically controlled independently. By adjusting the engaging pressure Pc1, Pc2, Pc3 and Pc4 of the hydraulic clutches 6a, 6b, 6c and 6d, the driving torque transmitted to the associated wheels 1L, 1R, 2L and 2R can be adjusted. The engaging pressure Pc1, Pc2, Pc3 and Pc4 of the hydraulic clutches 6a, 6b, 6c and 6d are controlled by a controller which will be described in detail later, by adjusting the pressure of working fluid distributed through respectively associated hydraulic circuits. Electromagnetic pressure control valves 10a, 10b, 10c and 10d are disposed within the hydraulic circuits for distributing the pressurized working fluid to respectively associated hydraulic clutches 6a, 6b, 6c and 6d. The electromagnetic valve 10a controls pressurized working fluid distribution for the hydraulic clutch 6a so as to adjust the engine output torque applied to the front-right wheel 1R. Similarly, the electromagnetic valve 10b controls fluid pressure distribution to the hydraulic clutch 6b and thus controls engine output torque distribution for the front-left wheel 1L. The electromagnetic valve 10c is associated with the hydraulic clutch 6c for the rear-right wheel 2R and the electromagnetic valve 10d is associated with the hydraulic clutch 6d for the rear-left wheel 2L. Each of the electromagnetic valves 10a, 10b, 10c has a pair of solenoids 10a' and 10a", 10b' and 10b", 10c' and 10c" and 10d' and 10d" for controlling the valve positions.

The electromagnetic valve 10a has an inlet port connected to a pressurized working fluid source including a fluid reservoir and a fluid pump 12 through a pressure regulator valve 11. The electromagnetic valve 10a also has a drain port connected to a drain circuit for returning the working fluid to the fluid reservoir. The solenoid valves 10a' and 10a" controls the valve position of the electromagnetic valve 10a in such a manner that:

when both of the solenoids 10a' and 10a" are deenergized, communication between the inlet port and the outlet port is established to feed the fluid pressure built up in the pressure regulator 11 directly distributed to the hydraulic clutch 6a (first position);

when the solenoid 10' is energized, all of the inlet, outlet and drain ports of the electromagnetic valve 10a are shut so as to preserve the current fluid pressure in the hydraulic clutch (second position);

when the solenoid valve 10a'' is energized, the inlet port is shut and communication is established between the outlet port and the drain port to drain the working fluid from the hydraulic clutch and thus reduce the engaging pressure in the clutch (third position).

The electromagnetic valves 10b, 10c and 10d are operated by respectively associated solenoids 10b' and 10b'', 10c' and 10c'' and 10d' and 10d'' to the aforementioned first, second and third positions in substantially the same manner as set forth above.

The solenoid 10a' and 10a'' are respectively connected to a power source +E at one terminal. The other terminal of the solenoid 10a' is connected to a collector electrode of a transistor 13a. Similarly, the other terminal of the solenoid 10a'' is connected to a collector electrode of a transistor 14a. Emitter electrodes of the transistors 13a and 14a are respectively connected to ground. A base electrode of the transistor 13a is connected to an OR gate 15a. On the other hand, the base electrode of the transistor 14a is connected to an AND gate 16a. The OR gate 15a has one input terminal connected to an AND gate 17a. The other input terminal of the OR gate 15a is connected to an output terminal of a comparator 18a. The AND gate 16a has one input terminal connected to a comparator 20a and the other, inverting input terminal connected to the output terminal of the comparator 18a. The AND gate 17a is connected to the output terminal of the AND gate 16a via one inverting input terminal and to the output terminal of a comparator 19a. With this arrangement, the AND gate 17a outputs a logical HIGH-level gate signal when the gate signal of the AND gate 16a is at logical LOW level and a comparator signal from the comparator 19a is at logical HIGH level. The AND gate 16a outputs a logical HIGH-level gate signal when a comparator signal from the comparator 18a is at logical LOW level and a comparator signal from the comparator 20a is at logical HIGH level.

The comparator 18a is connected to a wheel acceleration $\alpha_{w1}$ derivation circuit 23a at its inverting input terminal. The non-inverting terminal of the comparator 18a is connected to a reference signal generator which generates a reference signal having a value $-b$. The wheel acceleration $\alpha_{w1}$ derivation circuit 23a is also connected to a non-inverting input terminal of the comparator 19a. An inverting input terminal is connected to a projected wheel speed derivation circuit 40. The non-inverting input terminal of the comparator 20a is connected to a subtraction circuit 24a. Inverting input terminal of the comparator 20a is also connected to the select-LOW switch 39.

Figure 2:
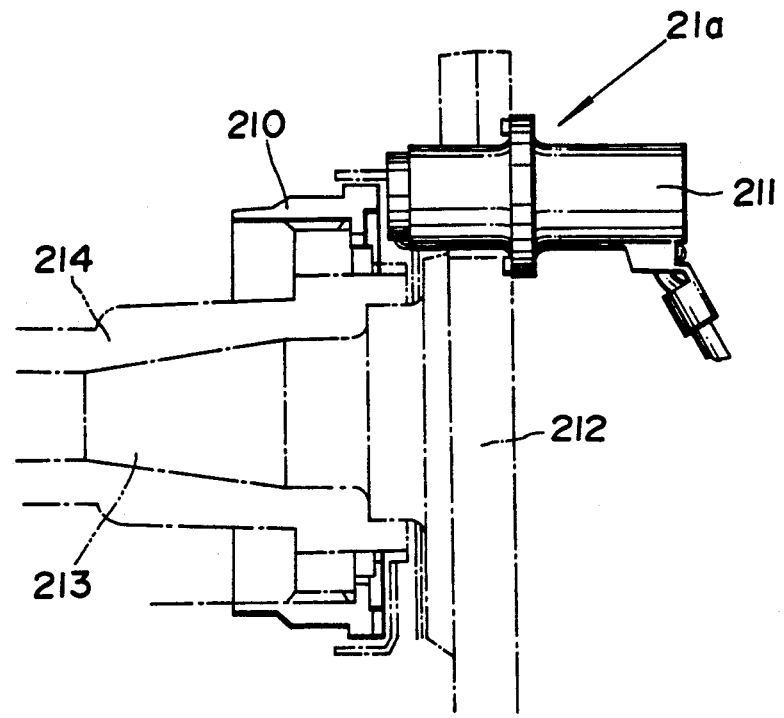
FIG. 2 is a front elevation of a wheel speed sensor employed in the preferred embodiment of the traction control system of FIG. 1.
Figure 3:
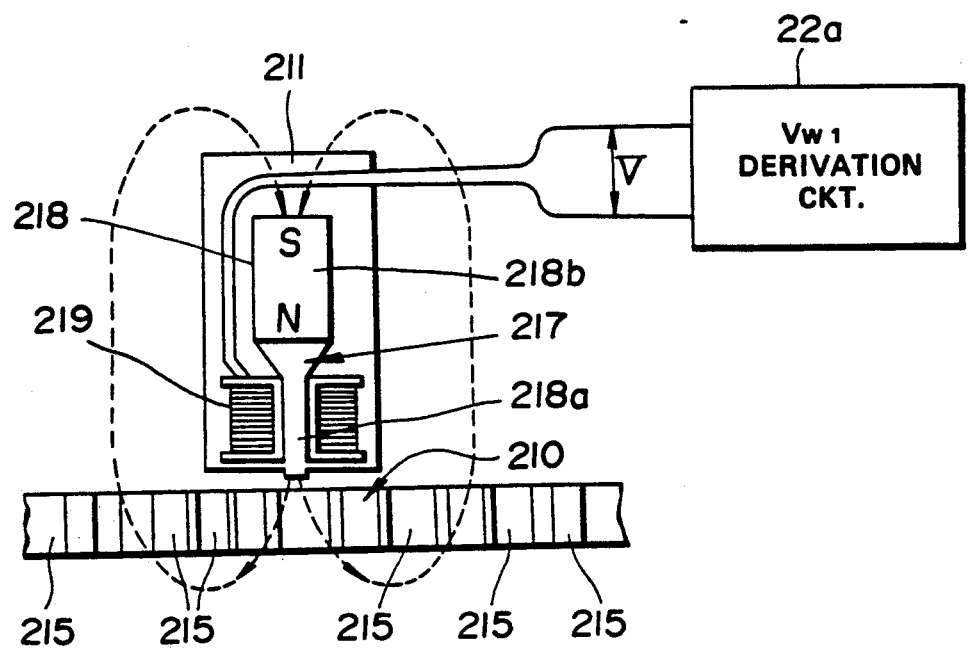
FIG. 3 is a diagram of the construction of the wheel speed sensor of FIG. 2.
Figure 4:
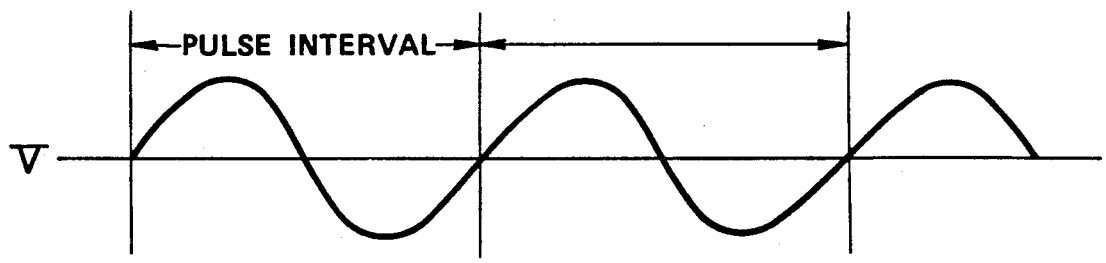
FIG. 4 shows the waveform of the wheel sensor signal.

The wheel acceleration derivation circuit 23a and the subtracting circuit 24a are connected to a wheel speed $V_{w1}$ derivation circuit 22a. The wheel speed $V_{w1}$ derivation circuit 22a is connected to a wheel speed sensor 21a. As shown in FIGS. 2 and 3, the wheel speed sensor 21a generally comprises a sensor rotor 210 rotatable with the associated front-right wheel 1R, and a sensor assembly 211. The sensor assembly 211 is fixedly secured to a shim portion 212 of a knuckle spindle 213. The sensor rotor 210 is fixedly secured to a wheel hub 214 for rotation therewith. As best shown in FIG. 3, the sensor rotor 210 has a plurality of sensor teeth 215 at regular angular intervals. The width of the teeth 215 and the grooves 216 therebetween are equal in the shown embodiment and define a unit angle of wheel rotation. The sensor assembly 211 comprises a magnetic core 217 aligned with its north pole (N) near the sensor rotor 210 and its south pole (S) distal from the sensor rotor. A metal element 218 with a smaller-diameter section 218a is attached to the end of the magnetic core 217 nearer the sensor rotor. The free end of the metal element 218 faces the sensor teeth 215. An electromagnetic coil 219 encircles the smaller-diameter section 218a of the metal element 218. The electromagnetic coil 219 is designed to detect variations in the magnetic field generated by the magnetic core 217 to produce an alternating-current sensor signal as shown in FIG. 4. That is, the metal element 218 and the magnetic core 217 form a kind of proximity switch which adjusts the magnitude of the magnetic field depending upon the distance between the free end of the metal element 218 and the sensor rotor surface. Thus, the intensity of the magnetic field fluctuates in relation to the passage of the sensor teeth 218 and in relation to the angular velocity of the wheel.

It should be noted that the wheel speed sensors 21b, 21c and 21d for monitoring rotation speeds of respectively associated wheels 1L, 2L and 2R have the same structure as the aforementioned wheel sensor 21a for the front-right wheel 1R.

The wheel speed $V_{w1}$ derivation circuit 22a receives the alternating-current sensor signal and derives a rotation speed $V_{w1}$ of the front-right wheel based on the frequency of the alternating-current sensor signal from the wheel speed sensor 21a, and the radius of the wheel. Wheel speed derivation circuits 22b, 22c and 22d also receive the alternating current sensor signals from respectively associated wheel speed sensors 21b, 21c and 21d for deriving wheel speed , $V_{w2}$, $V_{w3}$ and $V_{w4}$.

Based on the results of the arithmetic operations used to derive the wheel speed $V_{w1}$, the wheel speed derivation circuit 22a sends a wheel speed indicative signal to the subtracting circuit 24a and the wheel acceleration derivation circuit 23a.

The wheel acceleration derivation circuit 23a derives a wheel acceleration $\alpha_{w1}$ based on variations in the value of the wheel speed indicative signal. The wheel acceleration value $\alpha_{w1}$ can be derived by differentiating the wheel speed indicative signal values or, as an alternative, in the manner described in the European Patent First Publication 01 23 280. The contents of the aforementioned European Patent First Publication are hereby incorporated by reference for the sake of disclosure. The wheel acceleration derivation circuit 23a produces a wheel acceleration indicative signal indicative of the wheel acceleration $\alpha_{w1}$. Wheel acceleration derivation circuits 23b, 23c and 23d also receive the wheel speed indicative signals from respectively associated wheel speed derivation circuits 22b, 22c and 22d, and derive wheel accelerations $\alpha_{w2}$, $\alpha_{w3}$ and $\alpha_{w4}$ in essentially the same manner as in the wheel acceleration derivation circuit 23a. The wheel acceleration derivation circuit 23a feeds the wheel acceleration indicative signal to the comparators 18a and 19a.

As set forth above, the comparator 18a receives the wheel acceleration indicative signal through the inverting input terminal. On the other hand, the comparator 18a receives the deceleration reference signal indicative of the deceleration threshold $-b$ from the reference signal generator. The comparator 18a is responsive to a wheel acceleration indicative signal value smaller than the deceleration reference signal value to output the comparator signal with a logical HIGH level. The comparator 18a produces the comparator signal with the logical LOW level as long as the wheel acceleration indicative signal value is greater than or equal to the deceleration reference signal value.

The comparator 19a receives the wheel acceleration indicative signal through the non-inverting input terminal thereof. The inverting input terminal of the comparator 19a is connected to the projected vehicle speed $V_i$ derivation circuit 40. The projected wheel speed derivation circuit 40 derives a wheel acceleration threshold $+a$ and produces an acceleration reference signal. Therefore, the comparator 19a receives the acceleration reference signal through the inverting input terminal. The comparator 19a compares the wheel acceleration indicative signal value with the acceleration reference signal value so as to produce the comparator signal with the logical HIGH level when the wheel acceleration indicative signal value is greater than the acceleration reference signal value. The comparator 19a produces the comparator signal with the logical LOW level as long as the wheel acceleration indicative signal value is held smaller than or equal to the acceleration reference signal value.

The subtracting circuit 24a subtracts a predetermined acceptable wheel spin magnitude indicative signal having a value representative of a predetermined wheel spin magnitude $\Delta V_{w1}$ from the wheel speed indicative signal value $V_{w1}$. The subtracting circuit 24a produces an acceptable wheel speed indicative signal indicative of the results of subtraction $(V_{w1} - \Delta V_{w1})$.

It should be noted that, in the shown embodiment, the predetermined acceptable wheel spinning magnitude is set to a value slightly greater than an inevitable wheel spinning magnitude which necessarily occurs while the wheel is being driven by the engine output torque.

Therefore, the acceptable wheel speed indicative signal value represents acceptable minimum wheel speed to be regarded as reflecting no wheel spin. The acceptable wheel speed indicative signal is input to the comparator 20a through its non-inverting input terminal. The inverting input terminal of the comparator 20a is connected to a select-LOW switch 39. The select-LOW switch 39 is connected to a second select-LOW switch 38. The second select-LOW switch 38 is connected in turn to the wheel speed derivation circuits 22a, 22b, 22c and 22d for receiving therefrom the wheel speed indicative signals indicative of the wheel speeds $V_{w1}$, $V_{w2}$, $V_{w3}$ and $V_{w4}$ of the associated wheels 1L, 1R, 2L and 2R.

It is assumed that the actual vehicle speed may be close to the corresponding value derived from the minimum wheel speed value $V_{w1}, V_{w2}, V_{w3}$ or $V_{w4}$ among the wheel speeds of four wheels. Therefore, the select-LOW switch 38 selects the wheel speed indicative signal having the minimum value among the four inputs thereof. The second select-LOW switch 38 thus passes only the wheel speed indicative signal having the minimum value to the first select-LOW switch 39. The wheel speed indicative signal selected by the select-LOW switch 38 will be hereafter referred to as "minimum wheel speed indicative signal". The minimum wheel speed indicative signal from the select-LOW switch 38 is also fed to the projected wheel speed derivation circuit 40. The projected wheel speed derivation circuit 40 derives a projected vehicle speed $V_i$ based on the minimum wheel speed indicative signal.

It should be appreciated that the projected vehicle speed $V_i$ is a value corresponding to the wheel speed at the projected vehicle speed arithmetically obtained without regard to wheel spin; in other words, derived by setting the wheel spin magnitude to zero.

The projected vehicle speed derivation circuit 40 produces a projected vehicle speed indicative signal having a value representative of the projected vehicle speed. The projected vehicle speed indicative signal is also fed to the select-LOW switch 39. The select-LOW switch 39 compares the minimum wheel speed indicative signal value with the projected vehicle speed indicative signal value for the one of two signals having the smaller value. The selected one of the minimum wheel speed indicative signal and the projected vehicle speed indicative signal selected by the select-LOW switch 39 is output as a vehicle speed $V_{iw}$ indicative signal. This vehicle speed $V_{iw}$ indicative signal serves as a vehicle speed reference signal. The vehicle speed reference signal value $V_{iw}$ with the output value $(V_{w1} - \Delta V_{w1})$ of the subtraction circuit 24a in the comparator 20a. The comparator 20a generates a logical HIGH level comparator signal when the subtraction circuit output is greater than or equal to the vehicle speed reference signal value $V_{iw}$. This means that the wheel speed of the right-front wheel 1R is higher than the maximum possible wheel speed $(V_{iw} + \Delta V_{w1})$ corresponding to the vehicle speed. In this case, wheel-spin of the front-right wheel 1R is detected.

Similarly, wheel-spin of the front-left wheel 1L is detected by the comparators 20b, 20c, 20d, which respectively compare the outputs $(V_{w2} - \Delta V_{w2})$, $(V_{w3} - \Delta V_{w3})$ and $(V_{w4} - \Delta V_{w4})$ derived by the corresponding subtracting circuits 24b, 24c and 24d, with the vehicle speed $V_{iw}$ indicative signal value from the select-LOW switch 39. Furthermore, The comparator 19b, 19c or 19d detect when wheel acceleration values $\alpha_{w2}$, $\alpha_{w3}$ $\alpha_{w4}$ exceed the wheel acceleration threshold $+a$. On the other hand, the comparator 18b, 18c or 18d detect when the wheel acceleration $\alpha_{w2}$, $\alpha_{w3}$ and $\alpha_{w4}$ values are less than the wheel deceleration threshold $-b$.

Figure 5:
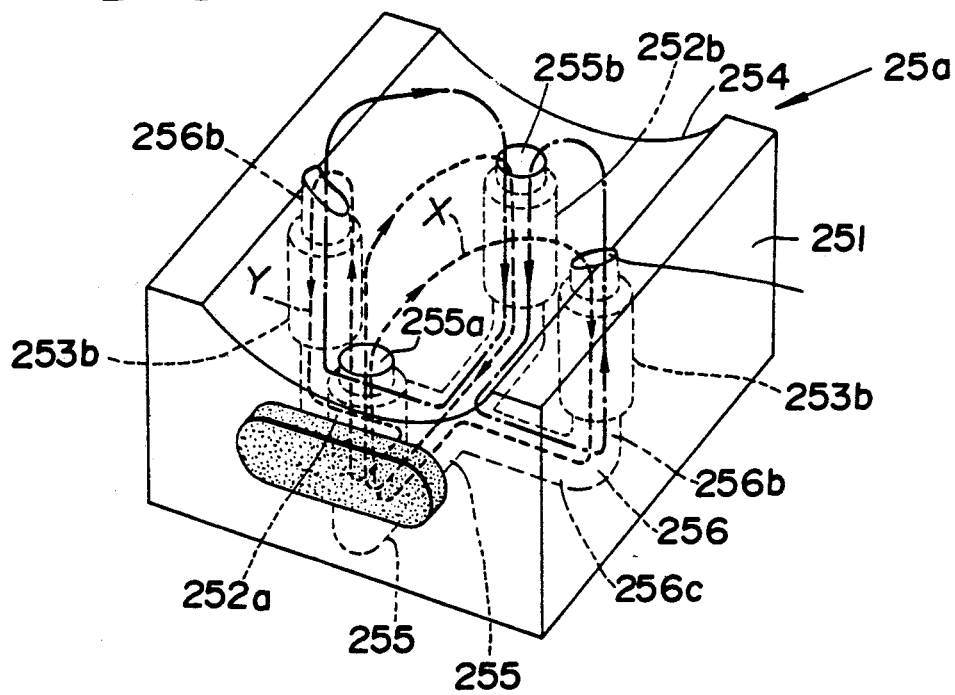
FIG. 5 is a perspective view of a torque sensor employed in the preferred embodiment of the traction control system of FIG. 1.
Figure 6:
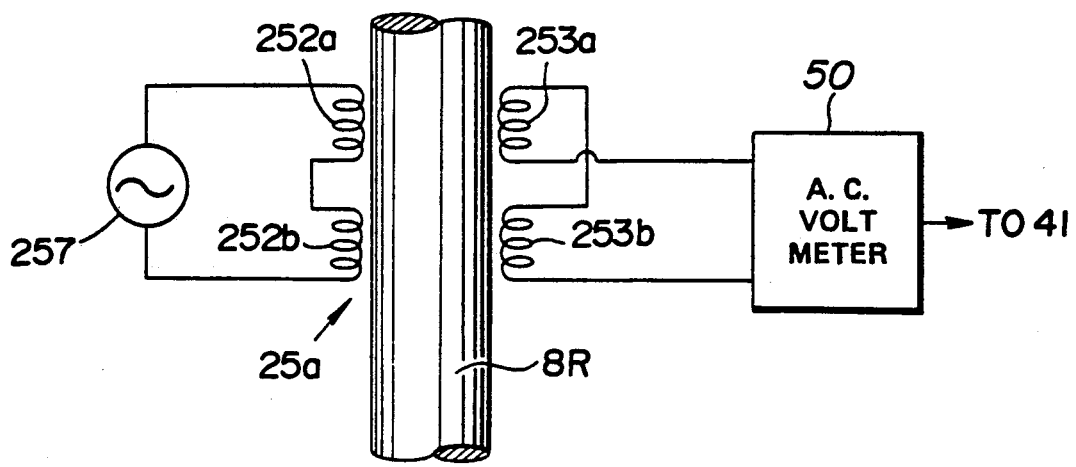
FIG. 6 is a diagram of the circuit in the torque sensor of FIG. 5

Torque sensors 25a, 25b, 25c and 25d monitor the torque on the respective wheels 1L, 1R, 2L and 2R. The torque sensors 25a, 25b, 25c and 25d are connected to an adder 41. As shown in FIGS. 5 and 6, these torque sensors 25 may comprise a sensor body 251 fixed to a vehicle body in a located near the drive shaft 8R of the front-right wheel 1R, a pair of exciting coils 252a and 252b, and a pair of sensing coils 253a and 253b. The sensor body 251 is made of a synthetic resin and has a laterally extending recess 254 for receiving the associated drive shaft 8R with a predetermined clearance, e.g. 1 to 2 mm.

The exciting coils 252a and 252b are wound on parallel arms 255a and 255b of a U-shaped core 255 respectively. The parallel arms 255a and 255b extend radially with respect to the drive shaft 8R. The exciting core 255 has an arm 255c connecting the parallel arms 255a and 255b and extending parallel to the axis of the drive shaft 8R. Accordingly, the exciting coils 252a and 252b extend nearly but not quite radially with respect to the drive shaft 8R. The combination of the exciting core 255 and the exciting coils 252a and 252b is generally embedded in the sensor body 251. The end faces of the parallel arms 255a and 255b are exposed flush with the surface of the recess 254 and conform to the peripheral surface of the drive shaft 8R.

The sensing coils 253a and 253b are wound on parallel arms 256a and 256b of a U-shaped core 256. The parallel arms 256a and 256b extend perpendicular to the axis of the drive shaft 8R and are mirror-symmetrical with respect to a plane including the center axis of the drive shaft 8R. The sensing core 256 has an arm 256c connecting the parallel arms 256a and 256b and extending perpendicular to the connecting arm 255c of the exciting core 255. Accordingly, the sensing coils 253a and 253b are symmetrical with respect to the combination of the exciting core 255 and the exciting coils 252a and 252b. The combination of the sensing core 256 and the sensing coils 253a and 253b is generally embedded in the sensor body 251. The end surface of the parallel arms 256a and 256b are exposed flush with the surface of the recess 254 and conform to the peripheral surface of the drive shaft 8R.

As shown in FIG. 6, the exciting coils 252a and 252b are electrically connected in series. An AC power generator 257 is electrically connected across the series combination of the exciting coils 252a and 252b via terminals (not shown) mounted on the sensor body 251. Since the sensing coils 253a and 253b are electromagnetically coupled to the exciting coils 252a and 252b via the cores 255 and 256 and the drive shaft 8R, magnetic fluxes connecting the exciting coils 252a and 252b and the sensing coils 253a and 253b and induce electric signals across the sensing coils 253a and 253b when the generator 257 allows alternating current to flow through the exciting coils 252a and 252b. These magnetic fluxes are represented by the broken arrow line in FIG. 5. The directions of the magnetic fluxes reverse at the same frequency as the alternating current. Since the magnetic fluxes pass through the drive shaft 8R, the electrical signals induced across the sensing coils 253a and 253b depend upon the magnetic permeability of the drive shaft 8R and thus on the torque applied to the drive shaft 8R.

The type of the torque sensor described above has been disclosed in greater detail in German Patent First Publication 35 17 849. The contents of this German Patent First Publication are hereby incorporated by reference for the sake of disclosure.

It should be appreciated that although a specific type of torque sensor has been illustrated for the preferred embodiment of the invention, any type of torque sensor suitable for monitoring torque on the drive shaft or vehicle wheel can be used in the preferred embodiment of the traction control system of FIG. 1. For example, the torque sensor disclosed in U.S. Pat. No. 4,572,005, issued on Feb. 25, 1986, to Toru KITA, and assigned to the common assignee to the present invention, can be utilized as a replacement for the above type of torque sensor. Therefore, the contents of this U.S. Patent are also hereby incorporated by reference for the sake of disclosure.

It should be further noted that the torque sensors 25b, 25c and 25d have the same structure as described above.

Returning to FIG. 1, the torque sensors 25a, 25b, 25c and 25d produce monitored torque indicative signals $T_{E1}$, $T_{E2}$, $T_{E3}$ and $T_{E4}$ and output these to the adder 41. The adder 41 derives the sum of the torque indicative signals and produces a driving torque signal having a value indicative of the total torque $T_E$ of the vehicle. The driving torque signal is fed to the projected vehicle speed derivation circuit 40. The projected vehicle speed derivation circuit 40 adjusts the value of the projected vehicle speed indicative signal depending on the driving torque signal from the adder 4i. Also, the projected vehicle speed derivation circuit 40 adjusts the value of the acceleration reference signal depending upon the value of the driving torque signal.

Figure 7:
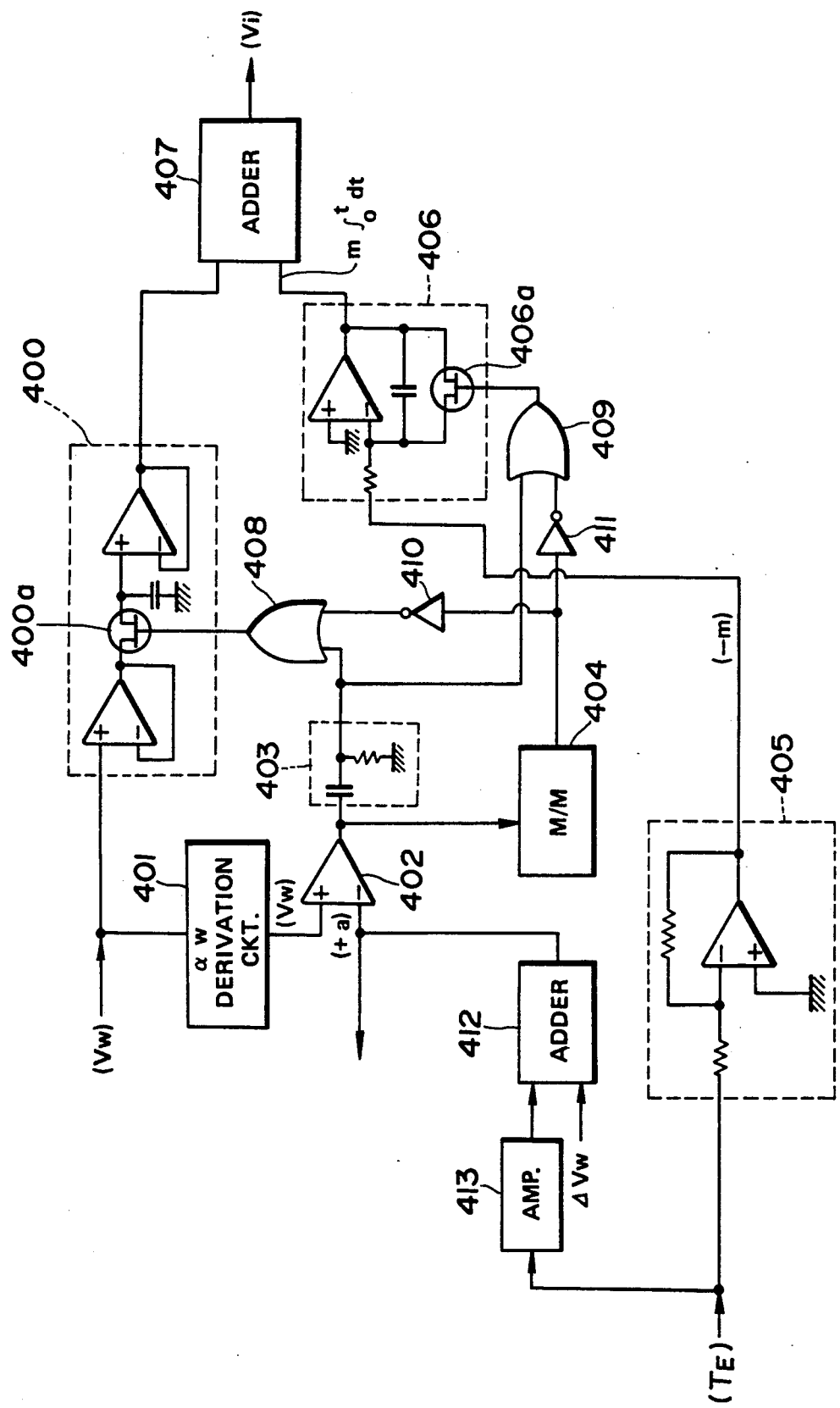
FIG. 7 is a block diagram of the preferred embodiment of the wheel slippage derivation system in the traction control system of FIG. 1.

FIG. 7 shows the projected vehicle speed derivation circuit 40 in the preferred embodiment of the traction control system in more detail. The projected vehicle speed derivation circuit 40 generally comprises a sample/hold circuit 400, a wheel acceleration derivation circuit 401, a comparator 402, a differentiating circuit 403, a monostable multivibrator 404, an inverting amplifier 405, an integrator circuit 406, an adder 407, OR gates 408 and 409, inverter circuits 410 and 411, an adder 412 and amplifier 413.

The sample/hold circuit 400 receives the minimum wheel speed indicative signal from the select-LOW switch 38 and samples same. The sample/hold circuit 26 is connected to a switching transistor 400a and is responsive to turning ON of the latter in response to a shot-pulse to hold the minimum wheel speed indicative signal value $\overline{V_w}$. The sample/hold circuit 400 outputs a held minimum wheel speed indicative signal based on the held value to the adder 407.

The wheel acceleration derivation circuit 401 derives a wheel acceleration $\overline{a_w}$ based on the minimum wheel speed indicative signal value $\overline{V_w}$. The wheel acceleration derivation circuit 401 produces an wheel acceleration $\overline{a_w}$ indicative signal based on the derived wheel acceleration value $\overline{a_w}$. The wheel acceleration $\overline{a_w}$ indicative signal is fed to a non-inverting input terminal of the comparator 402. The comparator 402 is, on the other hand, connected to the adder 412 at the inverting input terminal thereof. The adder 412 receives the driving torque signal from the adder 41 through the amplifier 413. The amplifier 413 performs non-linear amplification of the driving torque signal to output an amplified driving torque signal. The adder 412 calculates the sum of the amplified driving torque signal value and the predetermined value $\Delta a_w$ to derive the acceleration threshold +a of the acceleration reference signal.

The comparator 402 compares the wheel acceleration $\overline{a_w}$ with the acceleration threshold +a to produce a comparator signal. The logical level of the comparator signal of the comparator 402 goes HIGH when the wheel acceleration $\overline{a_w}$ is greater than the acceleration threshold +a, and otherwise remains LOW. The HIGH level comparator signal of the comparator 402 triggers the monostable multivibrator 404 and the differentiation circuit 403. The differentiation circuit 403 generates a one-shot-pulse in response to the leading edge of the HIGH-level comparator signal. The monostable multivibrator 404 then generates a HIGH-level signal for a given period of time.

The integrator 406 has a switching transistor 406a which is turned ON in response to a HIGH-level gate signal from the OR gate 409. The integrator circuit 406 is reset in response to turning ON of the switching transistor to clear the integrated value thereof. The integrator circuit 406 integrates a variable value −m received from the inverting amplifier 405. The variable value −m from the inverting amplifier 405 varies with the driving torque signal value from the adder 41. Therefore, the integrator circuit 406 outputs an integrator signal indicative of the integrated value $$m \int_o^t dt$$

to the adder 407. The adder 407 receives the held minimum wheel speed indicative signal and the integrator signal and obtains the sum thereof. The output of the adder 407 serves as the projected vehicle speed $V_i$.

On the other hand, the inverting-amplifier 405 receives the driving torque signal from the adder 41, inverts and amplifies the driving torque signal, and outputs the variable $-m$. Therefore, the absolute value of the variable $-m$ increases with increases in the driving torque signal value $T_E$. On the other hand, since the acceleration threshold $+a$ is derived by adding the predetermined value $\Delta a_w$ to the output of the amplifier 413, the acceleration threshold $+a$ becomes greater as the driving torque signal value $T_E$ increases.

Figure 8:
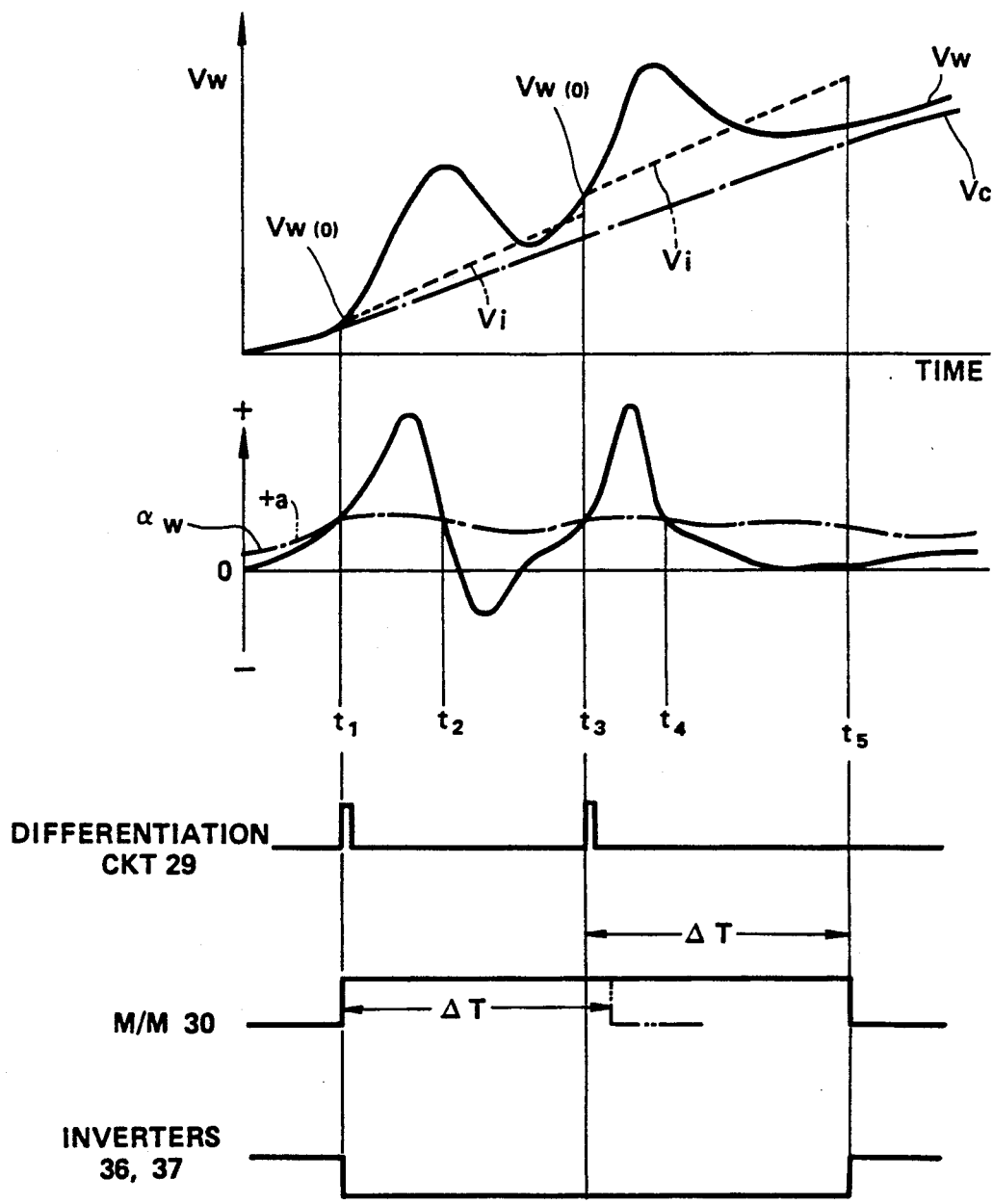
FIG. 8 is a timing chart illustrating an example of operation of the preferred embodiment of the wheel slippage derivation system of FIG. 7.

The process of deriving the projected vehicle speed $V_i$ will be described with reference to Fig. 8. It is assumed that when the minimum wheel speed $\overline{V_w}$ varies as shown by the solid line in FIG. 8, the vehicle speed $V_c$ varies as shown in the phantom line in FIG. 8. In this case, the wheel acceleration $\overline{a_w}$ from the minimum wheel speed $\overline{V_w}$ varies across the acceleration threshold $+a$ at times $t_1$, $t_2$, $t_3$, $t_4$. As will be seen from FIG. 8, the wheel acceleration $\overline{a_w}$ remains above the acceleration threshold $+a$ during the period $t_1$ to $t_2$ and $t_3$ to $t_4$. Therefore, the signal level of the comparator signal of the comparator 402 remains HIGH during the period $t_1$ to $t_2$ and $t_3$ to $t_4$. In response to the leading edge of the HIGH-level comparator signal of the comparator 402, the monostable multivibrator 404 is triggered for the given period of time $\Delta T$. The monostable multivibrator 404 is re-triggered by every leading edge of the HIGH-level comparator signal. Therefore, in the shown example, the monostable multivibrator is re-triggered at the time $t_3$ in response to the leading edge of the HIGH-level comparator signal produced at the time $t_3$. Therefore, the given period of time $\Delta T$ is renewed and therefore the HIGH- level output the monostable multivibrator 404 is maintained for a period $\Delta T$ starting from the time $t_3$. In the shown embodiment, the given period $\Delta T$ ends at a time $t_5$. Therefore, the output of the monostable multivibrator 404 goes LOW at the time $t_5$. The HIGH-level output of the monostable multivibrator 404 is inverted by the invertor circuits 410 and 411 and supplied to the OR gates 408 and 409. Therefore, while the output level of the monostable multivibrator 404 HIGH, the input to the OR gates 408 and 409 from the monostable multivibrator 404 remains LOW.

The differentiation circuit 403 is also responsive to the leading edge of the HIGH-level comparator signal of the comparator 402. The differentiation circuit 403 generates a one-shot-pulse when triggered by the leading edge of the HIGH-level comparator signal. The one-shot-pulse is fed to the OR gates 408 and 409. The gate signals of the OR gates 408 and 409 go HIGH in response to the one-shot-pulse to turn the switching transistors 400a and 406a of the sample/hold circuit 400 and the integration circuit 406 ON. Therefore, the switching transistors 400a and 406a are turned on almost immediately at the times $t_1$ and $t_3$.

The sample/hold circuit 400 is responsive to turning ON of the switching transistor 400a to hold the instantaneous minimum wheel speed value $\overline{V_w}$. Therefore, the minimum wheel speed value $\overline{V_w}$ is held at the times $t_1$ and $t_3$. Simultaneously, the integration circuit 406 is reset in response to turning ON of the switching transistor 406a. As reset, the integration circuit 406 re-starts its integrating the variable $-m$ from the inverting amplifier 405. As will be appreciated that the integrated value m $$m \int_o^t dt$$

represents expected wheel speed variation in the period between the times $t_1$ and $t_3$. The sum of the held minimum wheel speed value $\overline{V_w}$ and the integrated value $$m \int_o^t dt$$

thus represents projected instantaneous vehicle speed $V_i$ at each moment.

Since the variable $-m$ is derived by inverting the driving torque signal value $T_E$, the variable increases the driving torque signal value $T_E$ decreases. Since the driving torque increases as the road/tyre friction $\mu$ increases, the projected vehicle speed $V_i$ substantially corresponds to the actual vehicle speed even when the actual vehicle speed increases at a high rate on a high-friction road surface. Furthermore, according to the shown embodiment, since the acceleration threshold $+a$ varies with the driving torque $T_E$. more precise derivation of the projected vehicle speed $V_i$ is possible.

At the time $t_5$, the output level of the monostable multivibrator 404 goes LOW since no HIGH-level comparator signal is input within the given trigger period $\Delta T$ of the monostable multivibrator from the $t_3$. As a result, the inputs to the OR gates 408 and 409 through the inverters 410 and 411 go HIGH. The differentiation circuit 403 remains in non-triggered state due to absence of the HIGH-level comparator signal from the comparator 402 after the time $t_3$. As a result, the gate signals of the OR gates 408 and 409 are held at HIGH- level by the HIGH-level inputs from the monostable multivibrator 404 following inversion by the inverters 410 and 411. As a result. the switching transistors 400a and 406a are held ON.

By holding the switching transistor 400a ON, the sample/hold circuit 400 passes the instantaneous minimum wheel speed values $\overline{V_w}$ from moment to moment. Therefore, the instantaneous minimum wheel speed $\overline{V_w}$ at each moment is input to the adder. At the same time, since the switching transistor 406a is ON, the integration circuit 406 remains reset. Therefore, the integrated value $$m \int_o^t dt$$

remains zero. Therefore, the output of the adder 407 serving as the projected vehicle speed $V_i$ becomes identical to the minimum wheel speed $\overline{V_w}$ input from the sample/hold circuit 400.

Figure 9:
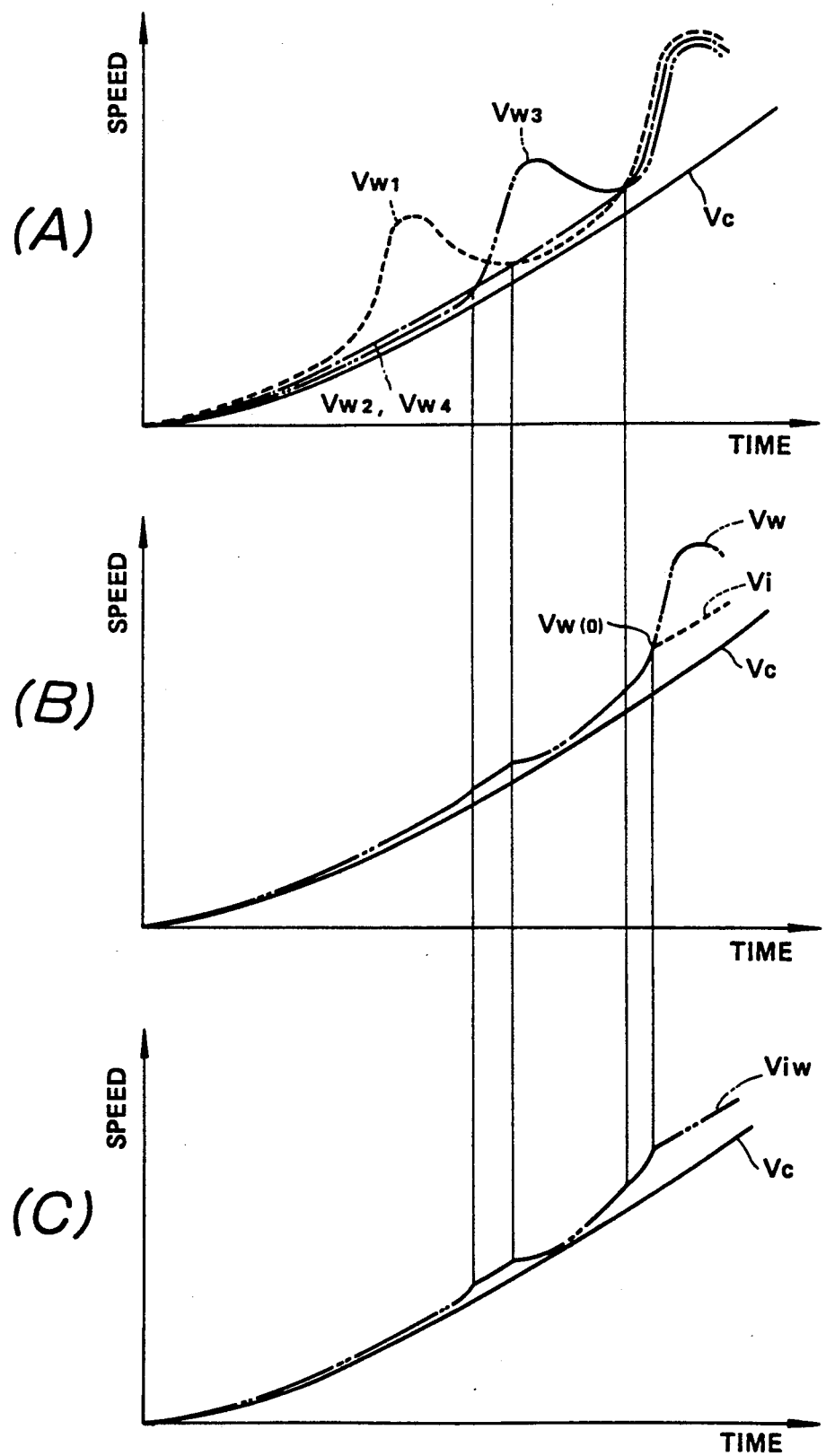
FIG. 9 shows relationships between vehicle speed and wheel speed.

When the wheel speeds $V_{w1}$, $V_{w2}$, $V_{w3}$ and $V_{w4}$ of the front-right, front-left, rear-right and rear-left wheels 1R, 1L, 2R and 2L vary as shown in FIG. 9, the select-LOW switch 38 selects the minimum value among the four wheel speed values. It should be appreciated that, in the example of FIG. 9, the wheel speed $V_{w2}$ of the front-left wheel 1L and the wheel speed $V_{w4}$ of the rear-left wheel $V_{w4}$ are normally the same. During the period I (shown in FIG. 7(B)), the wheel speed $V_{w3}$ has the smallest value among the wheel speeds. Therefore, during this period I, the wheel speed value $V_{w3}$ is taken as the minimum wheel speed value $\overline{V_w}$. In the period II, the wheel speed $V_{w3}$ becomes higher than the wheel speeds $V_{w2}$ and $V_{w4}$. Therefore, during the period II, the wheel speeds $V_{w2}$ and $V_{w4}$ are taken as the minimum wheel speed $\overline{V_w}$. Furthermore, in the period III, the wheel speed $V_{w1}$ drops below the wheel speeds $V_{w2}$ and $V_{w4}$, so that the wheel speed $V_{w1}$ is then taken as the minimum wheel speed value $\overline{V_w}$. In the period IV, the wheel speed $V_{w3}$ again becomes smallest. Therefore, in this period IV, the wheel speed value $V_{w3}$ of the rear-right wheel 2R is taken as the minimum wheel speed $\overline{V_w}$.

As set forth above, the projected vehicle speed $V_i$ derivation circuit derives the projected vehicle speed $V_i$ on the minimum wheel speed $\overline{V_w}$ selected as set forth above and the driving torque signal from the adder 41. The projected vehicle speed $V_i$ is compared with the minimum wheel speed value $\overline{V_w}$ in the select-LOW switch 39. The select-LOW switch 39 selects the smaller value and outputs the vehicle speed reference signal having a value $V_{iw}$ corresponding to the selected one of the projected vehicle speed $V_i$ the minimum wheel speed $\overline{V_w}$. As set forth above, the vehicle speed reference signal thus derived is fed to the comparators 20a, 20b, 20c and 20d from the select-LOW switch 39.

Figure 10:
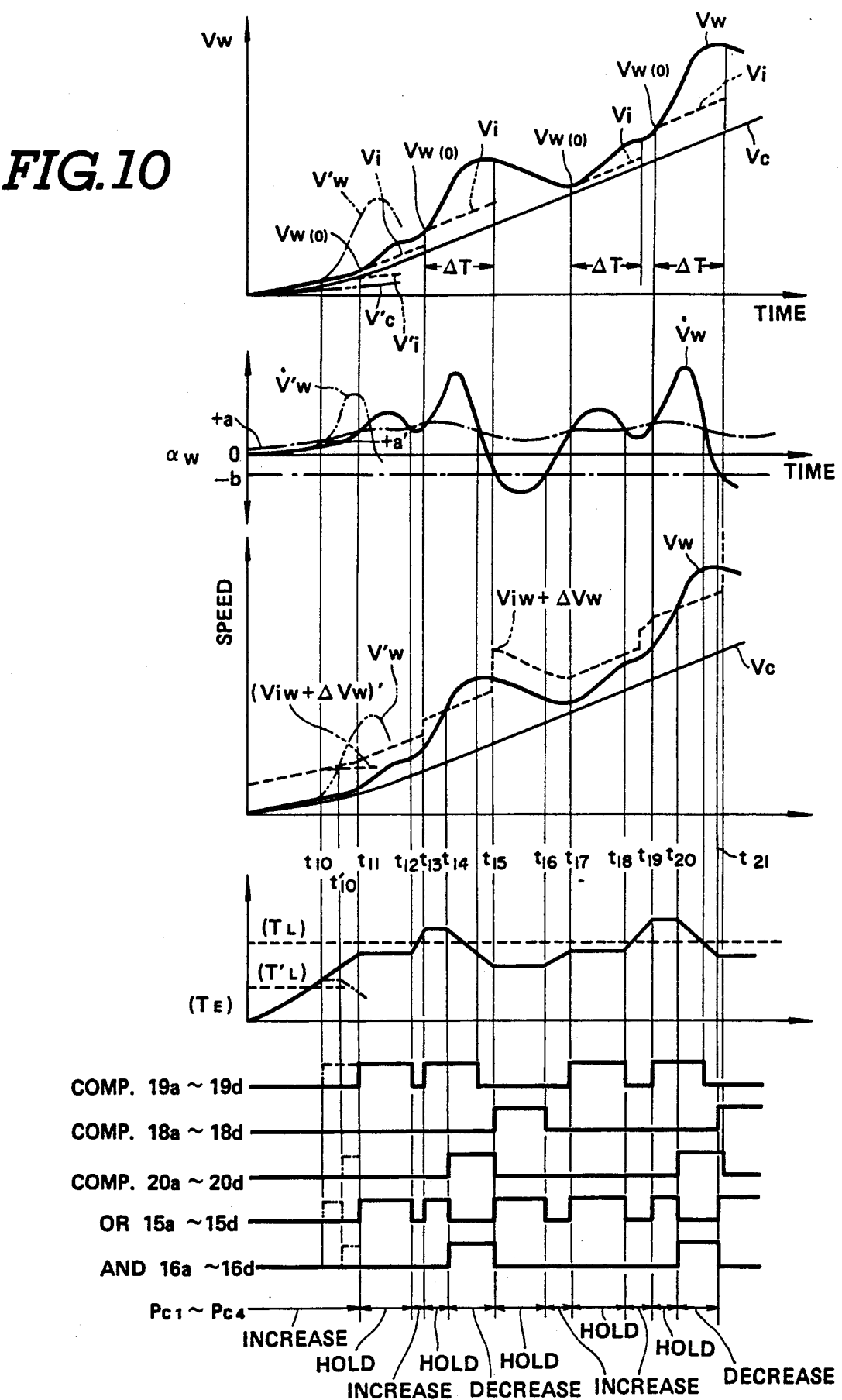
FIG. 10 is a timing chart illustrating more examples of operation of the preferred embodiment of the traction control system of FIG. 1.

FIG. 10 is a timing chart of the operation of the preferred embodiment of the traction control system of FIG. 1. In the example of FIG. 10, it is assumed that front-right wheel 1R, front-left wheel 1L, rear-right wheel 2R and rear-left wheel 2L all rotate in synchronism at the same rotation speed. Therefore, the wheel speed $V_w$ illustrated in FIG. 10 represents the wheel speeds of all of the front-right wheel 1R, front-left wheel 1L, rear-right wheel 2R and rear-left wheel 2L. Since all of the wheels rotate in synchronism, the wheel accelerations $a_w$ derived by the wheel acceleration derivation circuits 23a, 23b, 23c and 23d are identical. Furthermore, the wheel acceleration $\overline{a_w}$ derived by the wheel acceleration derivation circuit 401 is identical to those derived by the wheel acceleration derivation circuits 23a, 23b, 23c and 23d.

In the shown example, the wheel acceleration $a_w$ exceeds the acceleration threshold +a at times $t_{11}$, $t_{13}$, $t_{17}$ and $t_{19}$. Therefore, at each of these times $t_{11}$, $t_{13}$, $t_{17}$ and $t_{19}$, the comparator signal level of the comparator 402 of the projected vehicle speed derivation circuit 40 goes HIGH. Therefore, the monostable multivibrator 404 is triggered to produce the HIGH-level outputs at times $t_{11}$, $t_{13}$, $t_{17}$ and $t_{19}$ in response to the leading edge of the HIGH-level comparator signal. At the same time, the differentiation circuit 403 is triggered to output the one-shot-pulses at the times $t_{11}$, $t_{13}$, $t_{17}$ and $t_{19}$. Therefore, as set forth above, the wheel speed $V_w$ at the times $t_{11}$, $t_{13}$, $t_{17}$ and $t_{19}$ are held in the sample/hold circuit 400 of the projected vehicle speed derivation circuit 40. Therefore, after the times $t_{11}$, $t_{13}$, $t_{17}$ and $t_{19}$, the projected vehicle speed derivation circuit 40 outputs the arithmetically obtained projected vehicle speed $V_i$ indicative signal for the given period of time $\Delta T$. The projected vehicle speed $V_i$ indicated by the projected vehicle speed indicative signal is then compared with the wheel speed $V_w$ by the select-LOW switch 39. The select-LOW switch selects the smaller of the projected vehicle speed $V_i$ and the wheel speed $V_w$ and outputs the vehicle speed reference signal indicative thereof. The vehicle speed reference signal is input to respective comparators 20a, 20b, 20c and 20d.

The comparators 20a, 20b, 20c and 20d compare the wheel speed $V_w$ with the sum of the vehicle speed reference value $V_{iw}$ and the aforementioned given value $\Delta V_w$. Each of the comparators 20a, 20b, 20c and 20d produces a HIGH-level comparator signal while the wheel speed $V_w$ is greater than or equal to the sum value $(V_{iw} + \Delta V_w)$.

The comparators 18a, 18b, 18c and 18d compare the wheel acceleration $a_w$ derived by respectively associated wheel acceleration derivation circuits 23a, 23b, 23c and 23d with the deceleration threshold −b. The comparator signals form the comparator 18a, 18b, 18c and 18d all remain LOW while the wheel acceleration $a_w$ is greater than the deceleration threshold −b. In the shown example, the wheel acceleration $a_w$ drops below the deceleration threshold −b at a time $t_{15}$ and increases across the deceleration threshold at a time $t_{16}$. Therefore, the comparator signals from the comparators 18a, 18b, 18c and 18d go HIGH at time $t_{15}$ and remain HIGH until time $t_{16}$. Similarly, the comparators 19a, 19b, 19c and 19d compare the wheel acceleration $a_w$ with the acceleration threshold +a. The signal levels of the comparator signals of the comparators 19a, 19b, 19c and 19d remain LOW while the wheel acceleration is lower than the acceleration threshold and go HIGH when the wheel acceleration exceeds or equals the acceleration threshold. The wheel acceleration increases across the acceleration threshold +a at times $t_{10}$, $t_{11}$, $t_{13}$, $t_{17}$ and $t_{19}$. The comparator signals of the comparators 19a, 19b, 19c and 19d remain HIGH while the wheel acceleration $a_w$ is greater than or equal to the acceleration threshold +a.

The comparator signals of the comparators 18a, 18b, 18c and 18d and comparators 20a, 20b, 20c and 20d are input to the associated AND gates 16a, 16b, 16c and 16d. Therefore, the signal levels of outputs of the the AND gates 16a, 16b, 16c and 16d go HIGH while the comparator signals from the comparators 18a, 18b, 18c and 18d are LOW and the comparator signals of the comparators 20a, 20b, 20c and 20d are HIGH. Similarly the comparator signals 18a, 18b, 18c and 18d are fed to the OR gates 15a, 15b, 15c and 15d. The other input terminals of the OR gates 15a, 15b, 15c and 15d are connected to the output terminals of the AND gates 17a, 17b, 17c and 17d. The AND gates 17a, 17b, 17c and 17d output HIGH-level gate signals when the outputs of the AND gates 16a, 16b, 16c and 16d are LOW and the comparator signals of the comparators 19a, 19b, 19c and 19d are HIGH. The gate signals from the AND gates 17a, 17b, 17c and 17d are HIGH when the wheel speed $V_w$ value from the select-LOW switch 39 is greater than or equal to the output $(V_w - \Delta V_w)$ and wheel acceleration $a_w$ is greater than or equal to the acceleration threshold +a.

On the other hand, the outputs of the OR gates 15a, 15b, 15c go HIGH level when the gate signals from the AND gates 17a, 17b, 17c and 17d are HIGH and/or the comparator signals of the comparators 18a, 18b, 18c and 18d are HIGH. Therefore, the gate signal of the OR gates 15a, 15b, 15c and 15d go HIGH when the wheel speed $V_w$ from the select-LOW switch 39 is greater than or equal to the subtractor output $(V_w - \Delta V_w)$ and wheel acceleration $a_w$ is greater than or equal to the acceleration threshold +a, and/or the wheel acceleration $a_w$ is less than or equal to the deceleration threshold $-b$. In the shown example, the gate signals of the AND gates 16a, 16b, 16c and 16d remain HIGH during the periods $t_{14}$ to $t_{15}$ and $t_{20}$ to $t_{21}$. On the other hand, the gate signals of the OR gates 15a, 15b, 15c and 15d are HIGH during the periods $t_{11}$ to $t_{12}$, $t_{13}$ to $t_{14}$, $t_{15}$ to $t_{16}$, $t_{17}$ to $t_{18}$, $t_{19}$ to $t_{20}$ ...

The transistors 14a, 14b, 14c and 14d are turned ON in response to the HIGH-level gate signals from the AND gates 16a, 16b, 16c and 16d. On the other hand, the transistors 13a, 13b, 13c and 13d are turned ON in response to the HIGH-level gate signals from the OR gates 15a, 15b, 15c and 15d. While the transistors 13a, 13b, 13c, 13d and 14a, 14b, 14c, 14d are OFF, the solenoids 10a', 10a'', 10b', 10b'', 10 c', 10c''', 10d' and and 10d'' are deenergized. Therefore, the pressure control valves 10a, 10b, 10c and 10d remain in their first positions, establishing fluid communication between the inlet ports and outlet ports thereof. Consequently, the fluid pressure in the hydraulic clutches 6a, 6b, 6c and 6d increases to increase the engaging pressure $PC_1$, $PC_2$, $PC_3$ and $PC_4$ of the clutch plates therein. Therefore, the driving torque $T_E$ increases as the engaging pressure in the hydraulic clutches 6a, 6b, 6c and 6d increases.

At the time $t_1$, the wheel acceleration $a_w$ first exceeds the acceleration threshold +a. As a result, the gate signals from the OR gates 15a, 15b, 15c and 15d go HIGH. In response to the HIGH-level gate signals from the OR gates 15a, 15b, 15c and 15d, the associated transistors 13a, 13b, 13c and 13d turn ON. Thus, the solenoids 10a', 10b', 10c' and 10d' are energized to move the pressure control valves 6a, 6b, 6c and 6d to their third positions. Therefore, all of the inlet ports, outlet ports and drain ports are shut. This holds the fluid pressure in the hydraulic clutches at the level obtaining immediately before the pressure control valves 6a, 6b, 6c, 6d were operated to the third position. Therefore, the driving torque $T_E$ is held constant.

In the shown example, the wheel acceleration $a_w$ drops below the acceleration threshold +a while the pressure control valves 6a, 6b, 6c and 6d are held at the third position, at the time $t_{12}$. In response to this, the gate signals from the OR gates 15a, 15b, 15c and 15d go LOW. Therefore, the solenoids 10a', 10b', 10c' and 10d' are again deenergized to move the associated pressure control valves 10a, 10b, 10c and 10d to their first positions. The pressure control valves 10a, 10b, 10c and 10d remain in the first positions until the time $t_3$, when the wheel acceleration $a_w$ again increases across the acceleration threshold +a. At the time $t_3$, the solenoids 10a', 10b', 10c' and 10d' are again energized to move the pressure control valves 10a, 10b, 10c and 10d to their third positions. Therefore, during the period $t_{12}$ to $t_{13}$, the engaging pressure of the hydraulic clutches 6a, 6b, 6c and 6d increases in order to increase the driving torque $T_E$.

At the time $t_4$, the wheel speed $V_w$ becomes greater than the vehicle speed reference value $(V_{iw}+\Delta V_w)$. This is detected by the comparators 20a, 20b, 20c and 20d. In response to the HIGH-level comparator signals from the comparators 20a, 20b, 20c and 20d, the gate signals of the AND gates 16a, 16b, 16c and 16d go HIGH. Therefore, the transistors 14a, 14b, 14c and 14d are turned ON and the solenoids 10a'', 10b'', 10c'' and 10d'' move the pressure control valves 10a, 10b, 10c and 10d to their second positions to establish communication between the outlet ports and the drain ports thereof. At the same time, since the outputs of the comparators 17a, 17b, 17c and 17d go LOW due to the HIGH-level gate signals from the AND gates 16a, 16b, 16c and 16d, the gate signals of the OR gates 15a, 15b, 15c and 15d go LOW to turn OFF the transistors 13a, 13b, 13c and 13d. This deenergizes the solenoids 10a', 10b', 10c' and 10d'. As a result, the working fluid in the hydraulic clutches 6a, 6b, 6c and 6d drains to reduce the engaging pressures $PC_1$, $PC_2$, $PC_3$ and $PC_4$. This reduces the driving torque $T_E$ and increase road/tire traction.

Reducing the driving torque $T_E$ allows the road/tire traction to recover. On the other hand, reducing the driving torque $T_E$ lowers the wheel speed $V_w$. In the shown system, cessation of wheel spin is recognized when the wheel acceleration $a_w$ drops below the deceleration threshold $-b$. In the shown example, the wheel acceleration $a_w$ drops below the deceleration threshold $-b$ at the time $t_{15}$. When the wheel acceleration $a_w$ drops below the deceleration threshold $-b$, the outputs of the comparators 18a, 18b, 18c and 18d go HIGH. This turns ON the transistors 13a13b, 13c and 13d by way of the HIGH-level gate signals from the OR gates 15a, 15b, 15c and 15d. At the time $t_{15}$, the wheel speed $V_w$ becomes lower than the vehicle speed reference value $(V_{iw}+\Delta V_w)$ whereby the comparator signals from the comparators 20a, 20b, 20c and 20d go LOW. This induces LOW-level outputs from the AND gates 16a, 16b, 16c and 16d. As a result, the transistors 14a, 14b14c and 14d turn OFF, thereby deenergizing the solenoids 10a'', 10b'', 10c'' and 10d''. Therefore, the pressure control valves 10a, 10b, 10c and 10d are operated to their third positions. Therefore engaging pressures $PC_1$, $PC_2$, $PC_3$ and $PC_4$ of the hydraulic clutches 6a, 6b, 6c and 6d are held constant.

At the time $t_{16}$, the wheel acceleration $a_w$ again increases beyond the deceleration threshold $-b$. The comparators 18a, 18b, 18c and 18d are responsive thereto to turn the comparator signal levels LOW. As a result, the gate signals from of the OR gates 15a, 15b, 15c and 15d go LOW. Therefore, the transistors 13a, 13b, 13c and 13d are turned OFF and so deenergize the solenoids 10a', 10b', 10c' and 10d'. As a result, the pressure control valves 10a, 10b, 10c and 10d are returned to the first position to increase the engaging pressures $PC_1$, $PC_2$, $PC_3$ and $PC_4$ and thus increase the driving torque $T_E$.

Similarly, since the wheel acceleration $a_w$ increases across the acceleration threshold at time $t_{17}$, the pressure control valves 10a, 10b, 10c and 10d are operated to their third positions to hold the engaging pressure constant. In response to the drop in the wheel acceleration to below the deceleration threshold $-b$ at the time $t_{18}$, the pressure control valves 10a, 10b, 10c and 10d are operated to their first positions to increase the engaging pressure and thereby increase the driving torque $T_E$. At the time $t_{19}$, the wheel acceleration $a_w$ increases across the acceleration threshold +a. Therefore, the solenoids 10a', 10b', 10c' and 10d' are energized to operate the pressure control valves 10a, 10b, 10c and 10d to their third positions to hold the engaging pressures $PC_1$, $PC_2$, $PC_3$ and $PC_4$ of the hydraulic clutches constant. At the time $t_{20}$, the wheel speed $V_w$ increases across the vehicle speed reference value $V_{iw}+\Delta V_w$. Therefore, the solenoids 10a', 10b', 10c' and 10d' are deenergized and the solenoids 10a'', 10b'', 10c'' and 10d'' are energized to operate the pressure control valve to their second positions to reduce the engaging pressures $PC_1$, $PC_2$, $PC_3$ and PC$_4$. The pressure control valves 10a, 10b, 10c and 10d are held in their second positions until the time t$_{21}$, at which time the wheel acceleration $α_w$ below the deceleration threshold $-b$.

As will be appreciated herefrom, the driving torque is adjusted so as to avoid wheel-spin due to excessive torque exerted on the wheels. On the other hand, according to the shown process, the driving torque T$_E$ is controlled to be held at the maximum possible torque T$_L$ for as long as possible. By controlling the driving torque approximately at the maximum possible torque T$_L$, the driving characteristics of the vehicle can be optimized.

When the maximum possible torque T$_L$ is relatively low, as illustrated by T$_L'$ in FIG. 5, due to low road friction $μ$, the wheel acceleration $α_w$ can increase at a much greater rate than on normal or higher friction road surfaces but the vehicle speed will increase at a relatively low rate. In such cases, since the driving torque T$_E$ is adjusted so as to remain near the maximum possible torque T$_L'$, the absolute value of the variable -m used to derive the rate of change of the projected vehicle speed becomes small. Therefore, the vehicle speed reference value (V$_{iw}$+ΔV$_w$)' will be smaller. In this case, the comparator signals and gate signals vary as illustrated by the two-dotted lines in FIG. 5. Specifically, at the time t$_{10}$, the comparator signals of the comparators 19a, 19b, 19c and 19d turns HIGH in response to increase in the wheel acceleration $α_w$ to beyond the acceleration threshold. Therefore, the gate signals of the OR gates 15a, 15b, 15c and 15d go HIGH and turn the transistors 13a, 13b, 13c and 13d ON. Therefore, the pressure control valves 10a, 10b, 10c and 10d are operated to their third positions. Subsequently, at a time t$_{10}'$, the wheel speed V$_w'$ increases past the vehicle speed reference value (V$_{iw}$+ΔV$_w$). Therefore, the comparator signals from of the comparators 20a, 20b, 20c and 20d go HIGH and thus the gate signals of the AND gates 16a, 16b, 16c and 16d go HIGH. At the same time, the gate signals of the OR gates 15a, 15b, 15c and 15d go LOW in response to the LOW-level gate signals from the AND gates 17a, 17b, 17c and 17d. Therefore, the pressure control valves 10a, 10b, 10c, 10d are operated to their second positions to reduce the engaging pressures PC$_1$, PC$_2$, PC$_3$ and PC$_4$.

As will be appreciated herefrom, when the road friction $μ$ is relatively low, the driving torque distributed among the wheels is adjusted to be low enough to maintain good traction and to optimize the vehicle driving characteristics.

Figure 11:
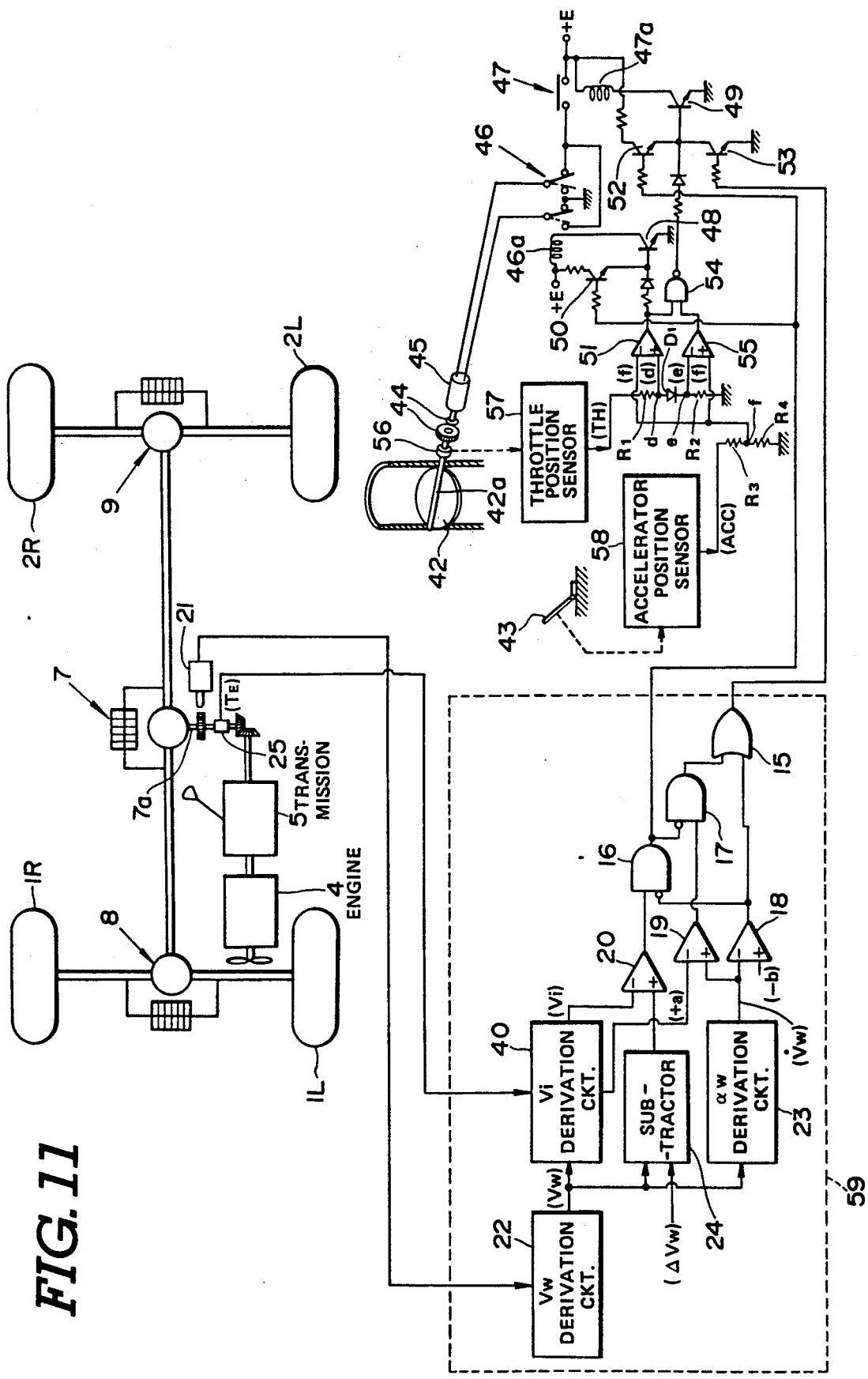
FIG. 11 is a diagram of another embodiment of a traction control system according to the invention.
Figure 12:
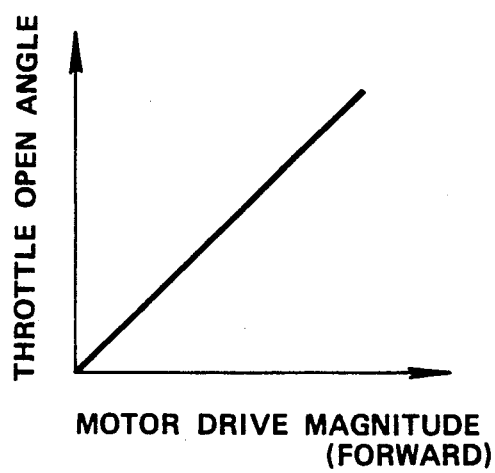
FIG. 12 is a graph of the a relationship between the driving magnitude of a throttle servo motor and the open angle of a throttle valve, which throttle servo motor is employed in another embodiment of the traction control system of FIG. 11.

FIG. 11 shows the second preferred embodiment of the traction control system in which the preferred embodiment of the projected vehicle speed derivation system is incorporated. In this embodiment, the center differential gear assembly 7, the front differential gear assembly 8 and the rear differential gear assembly 9 are equipped with slippage-limiting mechanisms to serve as limited-slip differential gears.

In the traction control system of FIG. 6, the driving torque is adjusted by adjusting the angular position of a throttle valve 42 instead of adjusting the hydraulic clutches in the former embodiment.

In this embodiment, the throttle valve angular position is controlled by means of an electrical throttle servo system. The throttle servo system generally comprises an electric motor 45 connected to a throttle valve shaft 42a through a reduction gear assembly 44. The driving magnitude of the motor 45 is controlled by a control signal having a value generally indicative of the magnitude of depression of an accelerator pedal 43. FIG. 11 shows the relationship between the throttle valve angular position (open angle) and the driving magnitude of the motor 45. As will be appreciated herefrom, the throttle valve open angle varies linearly with respect to the driving magnitude of the motor 45.

The terminals of the motor 45 are connected to relay switch 46. The relay switch 46 is connected to an electric power source $+E$ through a relay 47. The relay 47 is associated with a solenoid 47a to be operated between an open position and a closed position. The relay switch 46 is cooperative with the relay 47 so that the motor 45 is not driven while the solenoid 47a is deenergized and thus the relay 47 is in the open position. When the solenoid 47a is energized and the relay switch 46 is in the position illustrated in solid lines in FIG. 11, the motor 45 is driven forward to increase the throttle valve open angle. On the other hand, when the relay 47 is closed while the relay switch 46 is shifted to the position illustrated in phantom lines in FIG. 11, the motor is driven in reverse to reduce the throttle valve open angle.

The relay switch 46 is associated with a solenoid 46 for shifting between the positions illustrated in solid lines and in phantom lines in FIG. 11. The relay switch position illustrated in solid lines will be hereafter referred to as "forward position". Similarly, the relay switch position illustrated in phantom lines will be hereafter referred to as "reverse position". The solenoids 46a and 47a are connected to the power source $+E$ at one terminal. The other terminals of the solenoids 46a and 47a are connected to collector electrodes of transistors 48 and 49 so that they are connected to ground through collector-emitter paths of the transistors 48 and 49.

The base electrode of the transistor 48 is connected to the power source $+E$ through collector-emitter path of a transistor 50. The base electrode of the transistor 48 is also connected to an output terminal of a comparator 51. On the other hand, the base electrode of the transistor 49 is connected to the power source $+E$ through the collector-emitter path of a transistor 52 and to ground through the collector-emitter path of a transistor 53. The base electrode of the transistor 49 is further connected to an output terminal of a NAND gate 54. One input terminal of the NAND gate 54 is connected to the comparator 51. The other input terminal of the NAND gate 54 is connected to a comparator 55.

The comparator 51 has a non-inverting input terminal connected to a throttle position detecting circuit 57. The throttle position detecting circuit 57 is connected to a rotary encoder 56 which is fixed to the throttle valve shaft 42a. The rotary encoder 56 produces pulses at every given unit of throttle valve angular displacement. The throttle position detecting circuit 57 counts up and down the pulses from the rotary encoder depending upon the direction of the throttle valve angular displacement, i.e. closing or opening, to produce a throttle valve angular position indicative signal having a voltage TH indicative of the detected throttle valve angular position. The throttle valve angular position indicative signal of the throttle position detecting circuit 57 is voltage-divided by means of resistors R$_1$ and R$_2$. A diode D$_1$ is provided between the voltage dividing resistors R$_1$ and R$_2$ to induce a voltage difference between junctions d and e. The voltage difference between the junctions d and e provides hysteresis as illustrated by the hatched area in FIG. 13. As will be seen in FIG. 11, the potential at the junction d is applied to the aforementioned non-inverting terminal of the comparator 51.

The inverting input terminal of the comparator 51 is connected to an accelerator position sensor 58. The accelerator position sensor 58 is designed to produce an accelerator position indicative signal having a voltage ACC variable with the accelerator position. The accelerator position indicative signal is voltage-divided by means of a voltage divider constituted by resistors $R_3$ and $R_4$. The potential at a junction f between the voltage dividing resistors $r_3$ and $R_4$ is applied to the inverting terminal of the comparator 51. Therefore, the comparator signal of the comparator 51 goes HIGH when the throttle valve angular position indicative signal input to the non-inverting terminal is greater than the accelerator position indicative signal, i.e. the potential at the junction f.

On the other hand, the comparator 57 is connected to the junction e at its inverting terminal to receive the throttle valve angular position indicative signal. The non-inverting terminal of the comparator 57 is connected to the junction f to receive the accelerator position indicative signal. Therefore, the comparator signal of the comparator 57 goes HIGH when the potential at the junction e is smaller than the potential at the junction f.

The base electrodes of the transistors 50, 52 and 53 are respectively connected to a control circuit 59.

A base electrode of the transistor 53 is connected to an OR gate 15. On the other hand, the base electrode of the transistors 50 and 52 are connected to an AND gate 16. The OR gate 15 has one input terminal connected to an AND gate 17. The other input terminal of the OR gate 15 is connected to an output terminal of a comparator 18. The AND gate 16 has one input terminal connected to a comparator 20 and the other input terminal which is inverting input terminal, connected to the output terminal of the comparator 18. The AND gate 17 is connected to the output terminal of the AND gate 16 via one inverting input terminal and to the output terminal of a comparator 19. With this arrangement, the AND gate 17 outputs a logical HIGH-level gate signal when the gate signal of the AND gate 16 is at logical LOW level and a comparator signal from the comparator 19a is at logical HIGH level. The AND gate 16 outputs a logical HIGH level gate signal when a comparator signal from the comparator 18a is at logical LOW level and a comparator signal from the comparator 20 is at logical HIGH level.

The comparator 18 is connected to a wheel acceleration $A_{w1}$ derivation circuit 23 at its inverting input terminal. Non-inverting terminal of the comparator 18 is connected to a reference signal generator which generates a reference signal having a value $-b$. The wheel acceleration $a_{w1}$ derivation circuit 23 is also connected to a non-inverting input terminal of the comparator 19. An inverting input terminal of the comparator 19 is connected to a projected vehicle speed $V_i$ derivation circuit 40 to receive therefrom the acceleration reference signal indicative of the acceleration threshold $+a$. Non-inverting input terminal of the comparator 20 is connected to a subtraction circuit 24. Inverting input terminal of the comparator 20 is also connected to the projected vehicle speed derivation circuit 40 to receive therefrom the projected vehicle speed indicative signal $V_i$.

The wheel acceleration derivation circuit 23 and the subtracting circuit 24 are connected to a wheel speed $V_w$ derivation circuit 22. The wheel speed $V_{w1}$, derivation circuit 22 is connected to a wheel speed sensor 21. In this embodiment, the wheel speed sensor 2i is provided to monitor rotation of an input shaft 7a of the center differential gear assembly 7.

The wheel speed $V_{w1}$ derivation circuit 22 receives the alternating-current sensor signal from the wheel speed sensor 21 and derives the average rotation speed $V_{w1}$ of the front and rear wheels based on the frequency of the alternating-current sensor signal and the radius of the wheels.

Based on the result of arithmetic operations used to derive the wheel speed $V_w$, the wheel speed derivation circuit 22 feeds a wheel speed indicative signal to the subtracting circuit 24 and the wheel acceleration derivation circuit 23.

The wheel acceleration derivation circuit 23 derives a wheel acceleration $a_w$ based on the rate of change of the wheel speed indicative signal. The wheel acceleration derivation circuit 23 produces a wheel acceleration indicative signal indicative of the wheel acceleration $a_w$. The wheel acceleration derivation circuit 23 feeds the wheel acceleration indicative signal to the comparators 18 and 19.

As set forth above, the comparator 18 receives the wheel acceleration indicative signal through the inverting input terminal. On the other hand, the comparator 18 receives the deceleration reference signal indicative of the deceleration threshold $-b$ from the reference signal generator. The comparator 18 responds to a wheel acceleration indicative signal value less than the deceleration reference signal value by outputting a comparator signal at logical HIGH level. The comparator 18 produces the comparator signal at the logical LOW level as long as the wheel acceleration indicative signal value is greater than or equal to the deceleration reference signal value $-b$.

The comparator 19 receives the wheel acceleration indicative signal through the non-inverting input terminal thereof. The inverting input terminal of the comparator 19 is connected to the projected vehicle speed $V_i$ derivation circuit 40. The projected wheel speed derivation circuit 40 derives a wheel acceleration threshold $+a$ and produces an acceleration reference signal. Therefore, the comparator 19 receives the acceleration reference signal through the inverting input terminal. The comparator 19 compares the wheel acceleration indicative signal value with the acceleration reference signal value so as to produce the comparator signal with a logical HIGH level when the wheel acceleration indicative signal value is greater than the acceleration reference signal value. The comparator 19 produces the comparator signal with a logical LOW level as long as the wheel acceleration indicative signal value remains less than or equal to the acceleration reference signal value $+a$.

The subtracting circuit 24 subtracts a predetermined acceptable wheel spin magnitude indicative signal with a value representative of a predetermined wheel spin magnitude $\Delta V_w$ from the wheel speed indicative signal value $V_w$. The subtracting circuit 24 produces an acceptable wheel speed indicative signal indicative of the results of the subtraction ($V_w - \Delta V_w$).

Therefore, the acceptable wheel speed indicative signal is input to the comparator 20 through its non-inverting input terminal. The inverting input terminal of the comparator 20 is connected to the projected vehicle speed derivation circuit 40 as set forth above. The projected wheel speed derivation circuit 40 derives a projected vehicle speed $V_i$ based on the wheel speed indicative signal.

A torque sensor 25 monitors the torque on the input shaft 7a of the center differential gear assembly 7. The torque sensor 25 outputs monitored torque indicative signals $T_E$ to the projected vehicle speed derivation circuit 40. The adder 41 derives the sum of the torque indicative signals and produces a driving torque signal having a value indicative of the total torque $T_E$ of the vehicle.

The projected vehicle speed derivation circuit 40 adjusts the value of the projected vehicle speed indicative signal according to the torque indicative signal $T_E$ from the torque sensor 25. Also, the projected vehicle speed derivation circuit 40 adjusts the value of the acceleration reference signal value +a according to the value of the torque indicative signal value $T_E$.

With the foregoing construction, the AND gate 16 produces a HIGH-level gate signal when the wheel speed $(V_w + \Delta V_w)$ input from the subtracting circuit 24 is greater than the projected vehicle speed $V_i$ and the wheel acceleration $\Delta_w$ is greater than the deceleration threshold $-b$. On the other hand, OR gate 15 produces a HIGH-level gate signal when the wheel speed $(V_w + \Delta V_w)$ input from the subtracting circuit 24 is less than the projected vehicle speed $V_i$ and the wheel acceleration $a_w$ is greater than the acceleration threshold $+a$. The transistors 50 and 52 are turned ON by the HIGH-level gate signal from the AND gate 16. On the other hand, the transistor 53 is turned ON in response to the HIGH-level gate signal from the OR gate 15. While the transistors 50, 52 and 53 are OFF, the throttle servo system performs normal accelerator-depression-magnitude-dependent throttle valve control in response to the accelerator position indicative signal from the accelerator position sensor 58.

Figure 13:
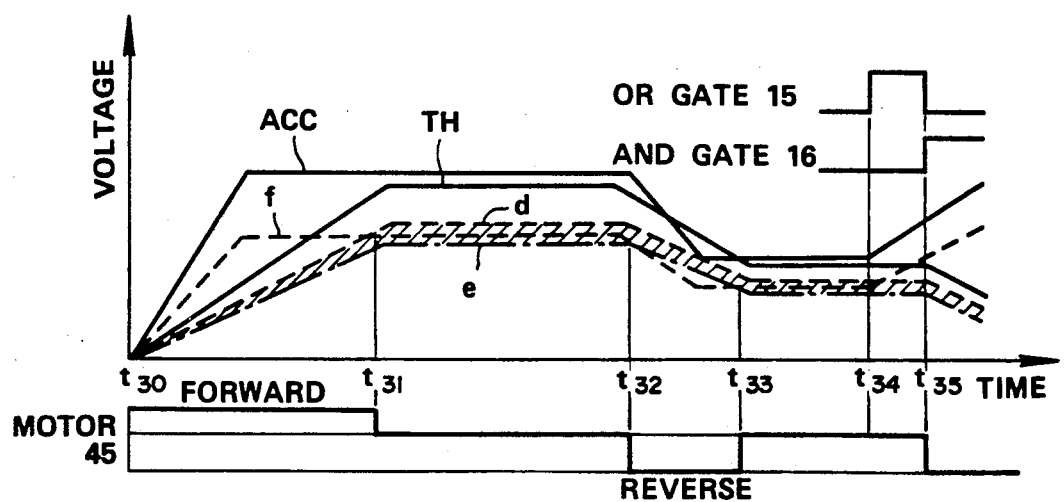
FIG. 13 is a timing chart showing variation of voltages in a throttle servo system in the traction control system of FIG. 11.

In the normal-control case, assuming the accelerator pedal is operated to vary the accelerator position indicative signal voltage ACC as illustrated in FIG. 13, the potential at the junction f between the voltage dividing resistors $R_3$ and $R_4$ varies as illustrated in broken lines in FIG. 13. In response to accelerator pedal operation, the angular position of the throttle valve TH is controlled by means of the servo system. According to variation of the throttle valve angular displacement as illustrated in FIG. 13, the potential at the junctions d and e varies as shown. At a time $t_{30}$, the accelerator position indicative signal voltage ACC increases as the accelerator pedal 43 is further depressed. Accordingly, the potential at the junction f increases until it exceeds the potentials of the junction d and e. At this time, the comparator signal of the comparator 51 remains LOW and the comparator signal of the comparator goes HIGH. Therefore, the transistor 48 is held OFF and the solenoid 46a remains deenergized. On the other hand, since the NAND condition is established by the LOW-level comparator signal from the comparator 51 and the HIGH-level comparator signal from the comparator 54, the gate signal of the NAND gate goes HIGH and turns the transistor 49 ON. As a result, the solenoid 47a is energized to supply power to the motor 45. At this o At the time $t_1$, the wheel acceleration $a_w$ time, since the solenoid 46a remains deenergized, the relay switch 46 is positioned at the position illustrated in solid lines in FIG. 11. Therefore, the motor 45 is driven forward to increase the throttle valve open angle.

According to the increase in the throttle valve open angle, the throttle valve angular position indicative signal voltage TH increases as illustrated in FiG. 13. Accordingly, the potentials at the junctions d and e increase. Forward drive of the motor 45 continues even after the accelerator depression stops. At a time $t_{31}$, the potential d increases beyond the potential at the junction f. This induces a HIGH-level comparator signal from the comparator 51. Since the potential at the junction f remains higher than the potential at the junction e, at this time, the HIGH-level comparator signal from the comparator 55 continues. As a result, the NAND condition is disrupted and the gate signal of the NAND gate 54 goes LOW. As a result, the transistor 49 is turned OFF to deenergize the solenoid 47a of the relay 47. Therefore, the relay 47 blocks power supply to the motor 45.

At the same time, since the comparator signal of the comparator 51 goes HIGH, the transistor 48 turns ON to energize the solenoid 46a. Therefore, the relay switch 46 is shifted to reverse.

By blocking of the power supply to the motor by means of opening of the relay 47, the motor 45 stops. Therefore, the throttle valve 42 is held in place. At a time $t_{32}$, the depression to the accelerator is released to allow the accelerator pedal 43 to return the accelerator position indicative signal voltage ACC decreases accordingly. Therefore, the potential at the junction f drops below the potential at the junction e. Therefore, the comparator signal of the comparator 55 goes LOW. This again establishes the NAND condition to induce a HIGH- level gate signal from the NAND gate. Therefore, the transistor 49 is again turned ON to energize the solenoid 47a. As a result, power supply to the motor 45 is resumed. At this time, since the potential at the junction f remains lower than the potential at the junction d, the comparator signal of the comparator 51 remains LOW. Therefore, the relay switch 46 remains in the reverse position. Therefore, by resuming power supply, the motor 45 is driven in reverse to decrease the throttle valve open angle. Reverse drive of the motor 45 continues even after the accelerator pedal return movement stops until the potential at the junction f becomes greater than the potential at the junction e, at a time $t_{33}$. In response to a potential at the junction f in excess of the potential at the junction e, the comparator signal of the comparator 55 goes HIGH and again disrupts the NAND condition. Therefore, the solenoid 47a is deenergized and thus power supply ceases. Therefore, the throttle valve 42 is held at a constant angular position.

At a time $t_{34}$, accelerator depression is resumed. It is assumed that wheel spin is caused by acceleration of the engine speed and the contaminant increase in the torque exerted on the wheels, whereby wheel acceleration $a_w$ may become greater than the acceleration threshold +a. As a result, the comparator signal of the comparator 19 goes HIGH and turns the gate signal of the AND gate 17 HIGH level. Therefore, the gate signal of the OR gate 15 goes HIGH at the time $t_{34}$. In response to the HIGH-level gate signal from the 0R gate 15, the transistor 53 goes ON. As a result, the base electrode of the transistor 49 is connected to ground through the collector-emitter path of the transistor 53. Therefore, the transistor 49 is turned OFF to deenergize the solenoid 47a and open the relay 47. Therefore, the power supply to the motor 45 is blocked. This causes the motor 45 to stop. Therefore, the throttle valve 42 remains in the angular position immediately before the power supply was shut off.

Subsequently, at a time $t_{35}$, the input $(V_w + \Delta V_w)$ the non-inverting input terminal of the comparator 20 becomes greater than the input $(V_i)$ at the inverting input terminal. Therefore, the comparator signal from the comparator 20 goes HIGH. It should be appreciated that since the accelerator depression magnitude is increasing, the wheel acceleration $\alpha_w$ remains greater than the deceleration threshold $-b$, and so the comparator signal of the comparator 18 remains LOW. Therefore, the gate signal of the AND gate 16 goes HIGH. This makes the input to the OR gate from the AND gate 17 and thus the gate signal of the OR gate 15 go LOW. Therefore, the transistors 50 and 52 are turned ON in response to the HIGH-level gate signal from the AND gate 16. On the other hand, the transistor 53 is turned OFF in response to the LOW-level gate signal from the OR gate 15.

At this time, the base electrode of the transistor 49 is connected to the power source $+E$ through the collector-emitter path of the transistor 52. Therefore, the transistor 49 is turned ON. Therefore, the solenoid 47a is energized to close the relay 47 and resume the power supply to the motor 45. At the same time, by turning ON of the transistor 50, the base electrode of the transistor 48 is connected to the power source $+E$ through the collector-emitter path of the transistor 50. Therefore, the relay switch 46 is shifted to the reverse position. As a result, the throttle valve open angle decreases despite the increase in accelerator depression. This causes a decrease in engine speed and in the driving torque to be distributed among the wheels and so allows road/tyre traction to recover.

With this operation, wheel spin can be successfully prevented.

It should be appreciated that, in the second embodiment of the traction control system, the projected vehicle speed derivation circuit 40 is identical in circuit lay-out to that employed in the first embodiment. Therefore, the projected vehicle speed derivation circuit adjusts the projected vehicle speed $V_i$ and the acceleration threshold $+a$ depending upon the driving torque, which reflects road friction.

Therefore, even in the second embodiment, road friction-dependent traction control can be performed.

Therefore, the present invention fulfills all of the objects and advantages sought therefor.

I claim:

1. A system for detecting wheel slippage comprising:
a first sensor for monitoring wheel rotation and producing a first sensor signal indicative of the wheel speed;
a second sensor for monitoring a parameter reflecting road surface friction and producing a second sensor signal indicative thereof;
a reference signal generator for sampling said first sensor signal having at a given timing and generating a reference signal having a value reflecting a projected vehicle speed based on the sampled first sensor signal value; and
an arithmetic means for modifying said reference signal value based on said second sensor signal value and comparing said first sensor signal value with the modified reference signal value so as to detect occurrences of wheel slippage.

2. A system as set forth in claim 1, wherein said second sensor monitors the driving torque exerted on vehicular wheel.

3. A system as set forth in claim 1, wherein said arithmetic circuit also derives a wheel acceleration value based on said first sensor signal and compares the wheel acceleration value with a given acceleration threshold to produce a command signal, and said reference signal generator samples said first sensor signal and in response to said command signal, and holds said first sensor signal for use as an initial reference signal value.

4. A system as set forth in claim 3, wherein said arithmetic circuit derives an elapsed time dependent coefficient based on said second sensor signal value to derive an adjustment value based on the time elapsed since said reference signal generator last sampled said first sensor signal and said coefficient and derives said modified reference signal value based on said initial reference signal value and said adjustment value.

5. A method for detecting wheel slippage comprising the steps of:
monitoring wheel rotation and producing a first signal indicative of the wheel speed;
monitoring a parameter reflecting road surface friction and producing a second signal indicative thereof;
sampling said first signal at a given timing for generating a reference signal having a value reflecting a projected vehicle speed based on the sampled first signal value;
modifying said reference signal value based on said second signal value; and
comparing said first signal value with the modified reference signal value so as to detect occurrence of wheel slippage.

6. A method as set forth in claim 5, wherein driving torque exerted on a vehicular wheel is monitored as said parameter.

7. A method as set forth in claim 5, which further includes the steps of deriving a wheel acceleration value based on said first sensor signal and comparing the wheel acceleration value with a given acceleration threshold to produce a command signal, sampling said first sensor signal, and in response to said command signal, holding said first sensor signal for use as an initial reference signal value.

8. A methods as set forth in claim 7, wherein the step of modifying said reference signal value includes derivation of an elapsed time dependent coefficient based on said second sensor signal value and derivation of an adjustment value based on the period of time for which said first sensor signal has been held.

9. A traction control system for an automotive vehicle having a wheel receiving driving torque from an automotive engine, comprising:
a first sensor for monitoring wheel rotation and producing a first sensor signal indicative of the wheel speed;
a second sensor for monitoring a parameter reflecting road surface friction and producing a second sensor signal indicative thereof;
a reference signal generator for sampling said first sensor signal at a given timing and generating a reference signal having a value reflecting a projected vehicle speed based on the sampled first sensor signal value and a predetermined vehicle speed variation representative coefficient;

controller means for modifying said reference signal value by adjusting said vehicle speed variation representative coefficient based on said second sensor signal value and comparing said first sensor signal value with the modified reference signal value so as to detect occurrences of wheel slippage and in such cases producing a control signal ordering reduction of driving torque exerted onto said wheel for recovering traction; and means for adjusting the driving torque exerted on the wheel, said driving torque adjusting means being responsive to said control signal to reduce the driving torque exerted on said wheel.

10. A system as set forth in claim 9, wherein said second sensor monitors the driving torque exerted on a vehicular wheel.

11. A system as set forth in claim 9, wherein said controller means also derives a wheel acceleration value based on said first sensor signal and compares the wheel acceleration value with a given acceleration threshold to produce a command signal, and said reference signal generator samples said first sensor signal and in response to said command signal, and holds said first sensor signal for use as an initial reference signal value.

12. A system as set forth in claim 11, wherein said controller means derives an elapsed time dependent coefficient based on said second sensor signal value to derive an adjustment value based on the time elapsed since said reference signal generator last sampled said first sensor signal and said coefficient and derives said modified reference signal value based on said initial reference signal value and said adjustment value.

13. A traction control system for an automotive vehicle having a wheel receiving driving torque from an automotive engine, comprising:

a first sensor for monitoring wheel rotation and producing a first sensor signal indicative of the wheel speed;

a second sensor for monitoring a parameter reflecting road surface friction and producing a second sensor signal indicative thereof;

a reference signal generator for generating a reference signal having a value reflecting a projected vehicle speed based on the first sensor signal value;

controller means for modifying said reference signal value based on said second sensor signal value and comparing said first sensor signal value with the modified sensor signal value so as to detect occurrences of wheel slippage and in such cases producing a control signal ordering reduction of driving torque exerted on said wheel for recovering traction; and means for adjusting the driving torque exerted on the wheel, said driving torque adjusting means being responsive to said control signal to reduce the driving torque exerted on said wheel, said means for adjusting including a hydraulic clutch with adjustable engaging pressure for adjusting driving torque and a valve means operable in response to said control signal for adjusting said engaging pressure so as to adjust the driving torque exerted on said wheel.

14. A traction control system for an automotive vehicle having a wheel receiving driving torque from an automotive engine, comprising:

a first sensor for monitoring wheel rotation and producing a first sensor signal indicative of the wheel speed;

a second sensor for monitoring a parameter reflecting road surface friction and producing a second sensor signal indicative thereof;

a reference signal generator for generating a reference signal having a value reflecting a projected vehicle speed based on the first sensor signal value;

controller means for modifying said reference signal value based on said second sensor signal value and comparing said first sensor signal value so as to detect occurrence of wheel slippage and in such cases producing a control signal ordering reduction of driving torque exerted on said wheel for recovering traction; and means for adjusting the driving torque exerted on the wheel, said driving torque adjusting means being responsive to said control signal to reduce the driving torque exerted on said wheel, said means for adjusting including an engine speed adjusting means which is responsive to said control signal for reducing engine speed so as to reduce the driving torque exerted on the wheel.

* * * * *